(12) United States Patent
Priest et al.

(10) Patent No.: US 10,445,720 B2
(45) Date of Patent: Oct. 15, 2019

(54) SYSTEMS AND METHODS FOR PAYMENT MANAGEMENT FOR SUPPORTING MOBILE PAYMENTS

(71) Applicant: Worldpay, LLC, Symmes Township, OH (US)

(72) Inventors: Travis Lee Priest, Durango, CO (US); Daniel J. Ourada, Bend, OR (US); Matthew D. Ozvat, Durango, CO (US); Nicholas G. Nayfack, Durango, CO (US); Charles E. Watts, Durango, CO (US)

(73) Assignee: Worldpay, LLC, Symmes Township, OH (US)

( * ) Notice: Subject to any disclaimer, the term of this patent is extended or adjusted under 35 U.S.C. 154(b) by 928 days.

(21) Appl. No.: 14/046,912

(22) Filed: Oct. 4, 2013

(65) Prior Publication Data

US 2014/0108261 A1  Apr. 17, 2014

Related U.S. Application Data

(63) Continuation-in-part of application No. 13/563,534, filed on Jul. 31, 2012.

(51) Int. Cl.
*G06Q 20/32* (2012.01)
*G06Q 20/20* (2012.01)
(Continued)

(52) U.S. Cl.
CPC ....... *G06Q 20/3226* (2013.01); *G06Q 20/202* (2013.01); *G06Q 20/3274* (2013.01);
(Continued)

(58) Field of Classification Search
CPC .................................................... G06Q 20/12
See application file for complete search history.

(56) References Cited

U.S. PATENT DOCUMENTS

2007/0108268 A1* 5/2007 Graves ................ G06Q 20/102
235/380
2012/0191615 A1* 7/2012 Schibuk ............. G06Q 20/3821
705/75
(Continued)

FOREIGN PATENT DOCUMENTS

EP    2128830 A1 * 12/2009 ......... G06Q 20/3278

OTHER PUBLICATIONS

Smart Card Alliance; "The Mobile Payments and NFC Landscape: A U.S. Perspective"; A Smart Card Alliance Payments Council White Paper; Publication No. PC-11002; Publication Date: Sep. 2011.*

*Primary Examiner* — Virpi H Kanervo
(74) *Attorney, Agent, or Firm* — Bookoff McAndrews, PLLC

(57) ABSTRACT

Systems and methods for managing mobile payments is provided. An account issuer provides an application that is loaded onto a mobile device, which enables a consumer to pay for transactions. The mobile payment application generates a unique code. The code is read by the point of sale terminal, which is then provided to the payment management system. The payment management system contracts the account issuer and authenticates the code, thereby receiving a primary account number. Account number and transaction information is used to authorize the transaction via payment systems. The payment system accepts or declines the transaction in a response. Tokens may be generated for the account number, and value added services may be generated based upon user behaviors.

20 Claims, 20 Drawing Sheets

(51) Int. Cl.
*G06Q 20/40* (2012.01)
*G06Q 20/38* (2012.01)
*G06Q 30/02* (2012.01)

(52) U.S. Cl.
CPC ......... *G06Q 20/385* (2013.01); *G06Q 20/401* (2013.01); *G06Q 30/0201* (2013.01)

(56) References Cited

U.S. PATENT DOCUMENTS

| | | | | |
|---|---|---|---|---|
| 2013/0256403 | A1* | 10/2013 | MacKinnon Keith | G06K 5/00 235/375 |
| 2014/0040144 | A1* | 2/2014 | Plomske | G06Q 20/38215 705/64 |
| 2014/0074637 | A1* | 3/2014 | Hammad | G06Q 20/12 705/21 |
| 2014/0207619 | A1* | 7/2014 | Ishebabi | G06Q 30/0623 705/26.61 |
| 2014/0279541 | A1* | 9/2014 | Castrechini | G06Q 20/3274 705/44 |

* cited by examiner

800a

800b

SYSTEMS AND METHODS FOR PAYMENT MANAGEMENT FOR SUPPORTING MOBILE PAYMENTS

CROSS REFERENCE TO RELATED APPLICATIONS

This application is a continuation-in-part of U.S. patent application Ser. No. 13/563,534, filed on Jul. 31, 2012, by Michelle K. Plomske et al., entitled "Systems and Methods for Multi-Merchant Tokenization", which is incorporated herein in their entirety by this reference.

BACKGROUND

This invention relates generally to systems and methods for payment management for supporting mobile payments. Such systems and methods enable rapid integration of payments performed using a mobile device, such as a smart phone, into Point-of-Sales (POS) systems with minimal upgrading. Further, such systems and methods allow for enhanced security because it eliminates the need for sensitive information to be stored on the POS. Lastly, the payment management described herein enables the performance of enhanced analytics to provide users with value added services.

Payments can traditionally be performed using cash, magnetic credit card or debit cards, or using a check. Other payment mechanism, such as smart credit cards, have never experienced the success in the marketplace that these more traditional forms of payment have enjoyed. However, more recently, with the more widespread adoption of smart phones and other mobile devices, the concept of banking using an application loaded upon a mobile device is becoming more common. In addition to traditional banking services, applications are being developed that enable a user to pay for transactions at a POS using their mobile device. These may be referred to as "mobile payment applications".

Generally, these mobile payment applications are developed by banking institutions that want to allow their account holders to pay from their accounts, much as a debit card does. These banks generally are required to partner with individual merchants, or POS developers, in order to have the application function. This has been the largest hurdle to the deployment of mobile payment applications.

Moreover, the use of a smart phone for payments generates a large amount of user specific data that is currently being under utilized by the banking institutions and merchants alike.

It is therefore apparent that an urgent need exists for systems and methods for payment management which supports mobile payments. Such systems will have the added benefit of eliminating the need for merchants to store sensitive account data, and further provides additional analytics for predictive value added services.

SUMMARY

To achieve the foregoing and in accordance with the present invention, systems and methods for managing mobile payments is provided. In these systems and methods, a bank (or other account issuer) provides an application that is loaded onto a mobile device. The application can be used at checkout by a consumer in order to pay for items. Payment management systems disclosed herein enables the usage of such mobile payment applications across a wide range of merchants in a transparent and seamless manner.

In some embodiments, the mobile payment application generates a unique code or token in response to the user wishing to pay for items. The code is scanned or otherwise read by the point of sale, which then provides the code to the payment management system. The payment management system then contracts the account issuer and authenticates that the code is indeed valid. In response, the account issuer provides the payment management system a primary account number associated with the user attempting to make the purchase.

The payment management system may also receive transaction totals and merchant Ids from the point of sales terminal. This information, along with the account identification number, may be employed to attempt to authorize the transaction via standard payment systems (such as Visa, for example). The payment system accepts or declines the transaction in a response.

If the transaction is accepted the system may further tokenize the received primary account number for added security. This tokenization includes validating the merchant ID against merchant logs to ensure that the merchant is configured for tokenization. The token is then generated as a hash of the primary account number, expiration, and a group ID. The encrypted token is provided to the merchant for storage. The group ID allows particular merchants to redeem the token at a later time.

In addition to enabling mobile payments, some embodiments of the systems and methods enable the generation of value added services by farming transaction logs to determine consumer types and consumer patterns. Additionally, consumer location and device information can be collected. This can all be used to generate predictive measures of consumer behaviors and purchasing patterns. These predictions may them be employed to generate offers for the consumer.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The following discussion relates to methods and systems for payment management which supports mobile payments. Such systems and methods have the added benefit of eliminating the need to store sensitive account data by merchants, and further provide additional analytics for predictive value added services.

The term "mobile payments" as used herein is intended to refer to means for payments which utilize a mobile device running a payment application. Such application may provide a wireless signal, scan-able barcode, or magnetic interface in order to transmit data to effectuate the payment.

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Payment Management Systems for Mobile Payments

Figure 1:
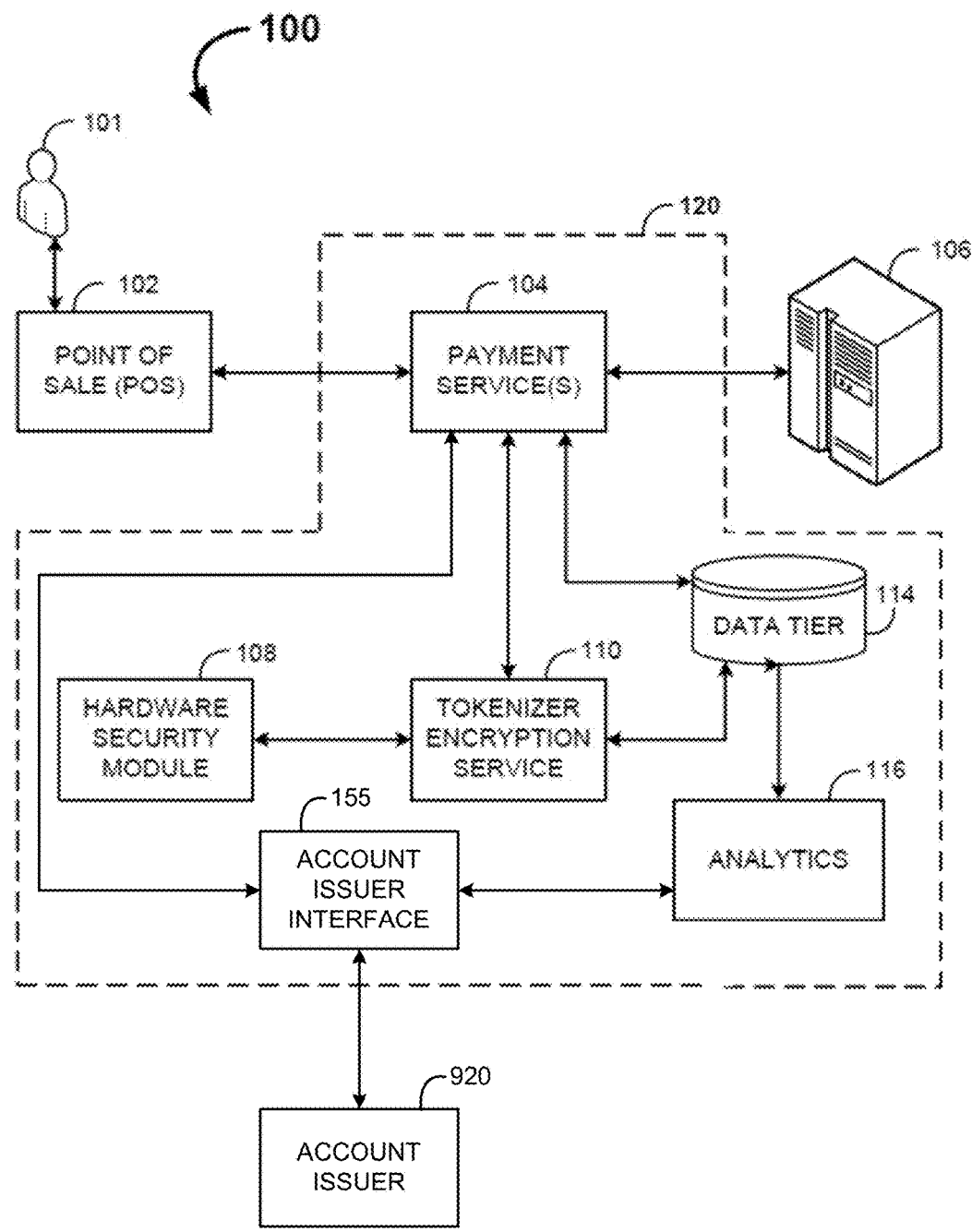
FIG. 1 is an example schematic block diagram for a system for managing payments, in accordance with some embodiments.

To facilitate this discussion, FIG. 1 provides an example schematic block diagram for a system for payment management, shown generally at 100. In this example block diagram, a purchaser 101 may be seen interacting with the point of sale terminal 102 in order to pay for a purchase, or otherwise settle a transaction. For the purposes of this application, in some embodiments, the purchaser 101 provides a mobile device running a payment application. Typically this payment application conveys a code to the point of sale 102 which may include payment information, or potentially may merely provide a secure identification for the user that may be used to access the user's payment information through the payment management system.

The point of sale 102 may include a fixed reader coupled to a terminal, an integrated cash register system, or the like. In some cases, the point of sale terminal 102 may encrypt the collected data at the reader head (if utilized) in order to ensure security. Alternatively the initial encryption may be performed in software deeper in the point of sale terminal 102, in some embodiments. Software encryption, however, increases vulnerability to security breach if the point of sale terminal 102 has been compromised.

In other embodiments, the payment application may provide a code with an authenticated user identity which may be employed by the point of sale 102 to get sensitive account information from an account issuer directly, or through the payment management system. In some example embodiments, the point of sale 102 may contact the payment services 104 of the payment manager system 120 and provide the code gained from the payment application. Additionally, a request for account information may be provided. The payment services may then route this request to an account issuer interface 155, which can subsequently contact the account issuer 920. The account issuer 920 is often a traditional bank or other financial institution. The account issuer is involved in the development or deployment of payment applications, and as such may validate the code as being authentic. Once the code is authenticated, the account issuer 920 may directly communicate the account information to the point of sale 102, or may route this sensitive information back to the POS through the payment management system 120. The account issuer interface 155 may also collect analytics related to where the user 101 is in order to populate the analytics database 116.

In the case that the point of sale 102 receives account data via such a backchannel, the sensitive data may be encrypted by the account issuer, payment management system, or at the POS itself. Regardless of location of initial encryption, an encryption protocol may be employed, in some embodiments. This encryption protocol typically includes a merchant ID, amount for the transaction, passwords and an encrypted portion. The encrypted portion may be in the following format, in some embodiments:

```
<encryption>
    <block>
    <key>
    <serial number>
</encryption>
```

Note that while a specific encryption protocol is presented here, alternate known encryption schemas may be readily employed in alternate embodiments.

The point of sale terminal 102 may be capable of providing the collected account information, including account information provided by the account issuer, (and other sensitive information) to a payment service(s) 104 in the payment management system 120 (payment processor). This transfer of data may be performed over the internet or via a dial in connection. The payment service(s) 104 may include a plurality of systems for receiving the data, dependent upon transmission mechanism and data type, as will be discussed in greater detail below. The payment service(s) 104 does an initial check for encryption of the data. If the received data is not encrypted, it may be transferred immediately to payment system(s) 106 for transfer of funds, or directly to entities such as Visa, MasterCard, etc. Payment system(s)

106 may include entities such as Global Card Bank, for example. However, where encryption is present, and tokenization is desired, the payment service(s) 104 may transfer the information to a tokenizer encryption service 110 for processing. The payment service(s) 104 validates the encrypted block, encrypted key and serial number lengths. It also validates the merchant's ID with a stored database of terminal IDs.

The tokenizer encryption service 110 validates credentials and identifies keys for the encrypted data. The tokenizer encryption service 110 may leverage a data tier 114 populated by analytics 116 system and CRM application(s) in order to perform validation and identification of keys. The data is then submitted to a hardware security module 108 for decryption and the generation of a token. The token includes a primary account number (PAN), a group ID (GID), an expiration date for the token, and an expiration date for the card.

In some embodiments, the expiration date of the token may be varied depending upon if the token is designated as a single use token, or for recurring transactions (i.e., a subscription). For example, a 1 year and 2 year expiration may be provided for a single use and recurring token, respectively. This allows for a longer validity period where the merchant is anticipating reuse of the token, and ensures that tokens are not stored unnecessarily long for single use tokens.

The token, which is encrypted, and clear text of the data supplied by the point of sale terminal 102 are returned to the tokenizer encryption service 110, and subsequently to the payment service(s) 104. The payment service(s) 104 transfers the clear text to the payment system(s) 106 for a transaction response. The response is then provided, along with the token, back to the merchant. The merchant may then store the encrypted token in a local database for later transactions.

Unlike current tokenization technology, the PAN (primary account number) is stored as part of the token, with the merchant, in encrypted form. The merchant cannot access the PAN without the keys maintained within the hardware security module 108. Thus, for account information to be compromised, both the merchant system and the tokenization and payment management system 120 would need to be breached. In all other known token based systems, the PAN is stored exclusively upon the payment processor's system, enabling a hacker to collect account information by breaching a single system.

Additionally, embodiments of the present system includes a GID (group ID) which enables more than one merchant to utilize the token. The data tier 114 maintains a copy of merchant IDs and correlates them with one or more GIDs. When a token is supplied to the system during a later transaction, the GID in the token is compared against the merchant ID listed in the data tier 114. If they match, then the tokenization and payment management system 120 may process the token.

In this manner the payment management system 120 enables the payment using a code derived from a payment application running on a mobile device through existing point of sale infrastructures. Current point of sales terminals are already designed to communicate bilaterally with the payment management system. This system requires no additional hardware at the POS, yet enables for entirely new mechanisms of payment.

Also note, that since the POS receives a code which does not include any account information, and the account data returned to the POS may be encrypted prior to being received by the payment management system, an unsurpassed level of security is provided as the POS terminal is never exposed to account data that is not encrypted.

Figure 8A:
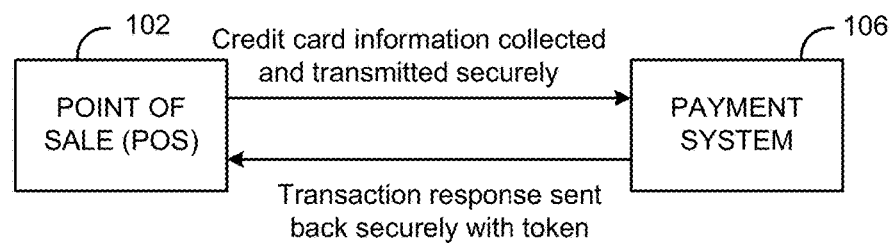
FIGS. 8A and 8B are example schematic block diagrams for mechanisms for secure transactions, in accordance with some embodiments.
Figure 8B:
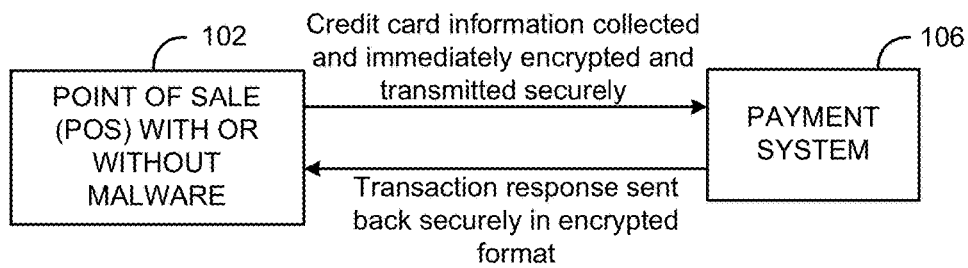

FIGS. 8A and 8B provide example block diagrams for methods for securely handling transaction payments, in accordance with some embodiments. In FIG. 8A, the point of sale terminal 102 may collect credit card information (or other sensitive payment information) and transfer the data securely to the payment system(s) 106, at 800a. Intermediary in this transaction is a payment processor which ensures validity of the request, and generates a multi-merchant token. The payment system(s) 106 returns a transaction response securely with the token generated by the payment processor to the merchant.

By relying upon a token, the merchant no longer has to send the account information for subsequent transactions and may instead utilize the token for follow-up activities. For example, a restaurant may initially run a transaction for the cost of a meal, and perform a follow-up transaction using the token for processing the tip. Another example may include recurring transactions for a gym membership. A retailer may use tokens for returns or price adjustments rather than resending sensitive transaction information. Further, through the usage of payment applications that generate codes, the merchant system may in fact never be exposed to the sensitive account information.

In contrast to current tokenization systems, the presently disclosed systems and methods transfer a token with a unique makeup (including encrypted card data) that enables distributed storage of sensitive information, as well as the ability for multiple merchants to share the token for transactions. This may be of particular use in franchise or related businesses, where a customer's payment information may be processed by multiple merchants.

For example, a customer may purchase a good from location A from a franchise retailer. The customer then decides to return the item to location B which is within the same franchise, but may not be owned by the same entity. Instead of denying the transaction, or re-running the card using the presently disclosed system, the token may be leveraged to perform the transaction.

FIG. 8B illustrates a schematic block diagram illustrating end to end (E2E) encryption, at 800b. End to end encryption protects sensitive information from malware loaded upon a point of sale terminal, and may be employed in conjunction with multi-merchant tokenization.

In these systems, the information is encrypted at the point of collection. For a credit card this may be at the reader itself. For payments made using a payment application, this may be immediately upon receipt of the account data (if it is not received in an encrypted state initially). Thus, the information conveyed from the collection point to the rest of the POS system is already secure. Since the POS system may be infected by malware, this early encryption ensures that the data remains secure from the very start. While the currently disclosed systems and methods can be employed with end to end encryption, this is not a required feature to employ the methods disclosed herein.

The secure data is then transmitted to the payment system(s) 106, and the response may be returned in an encrypted format. Since the data is never in the clear, E2E payment methods ensures added security from potential vulnerability at the point of sale terminal 102. Further, when utilized in conjunction with multi-merchant tokens, the system's security is even more robust.

II. Multi-Merchant Tokenization

Figure 2:
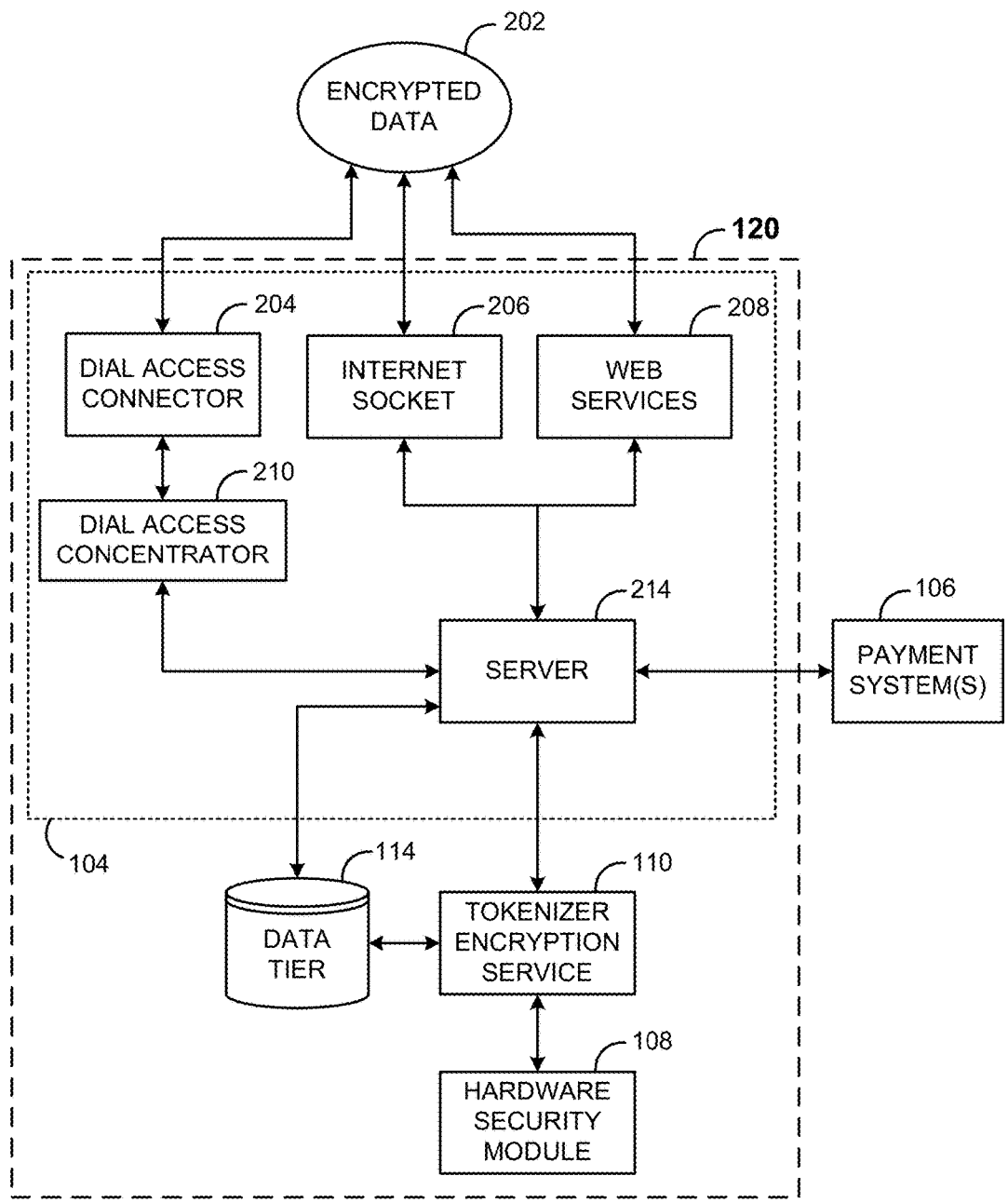
FIG. 2 is an example schematic block diagram for a more detailed view of components within the payment management system, in accordance with some embodiments.

The following sections shall provide greater detail of the tokenization aspects of the payment management system. Turning to FIG. 2, an example schematic block diagram for a more detailed view of components within the payment management system is provided, in accordance with some embodiments. In this example block diagram, encrypted data 202 from the point of sale terminal 102 is seen being delivered to the payment service(s) 104 via any of a dial access connector 204, internet socket 206 or web services 208. When data is delivered to the dial access connector 204, it may pass through a dial access concentrator 210 prior to being provided to a server 214. If data passes through the internet socket 206 or web services 208, it may be supplied to the server 214.

In addition to the server 214, other servers may be included, in alternate embodiments, in order to handle alternate inputs. For example, in embodiments where gift cards or loyalty cards are being processed, the system may include a gift card server or loyalty card server. Generally, the system is designed to be scalable to take any number of payment types, as is desirable for any particular scenario.

The server 214 determines if token is present and/or if data is encrypted. If not encrypted and the merchant is not setup for tokenization, the clear text data is transferred to the payment system(s) 106 (such as Global Card Bank, Visa, etc.) for approval or declining. Otherwise, if the data includes a token or encrypted data, it may be provided to the tokenizer encryption service 110, as previously discussed.

Figure 3:
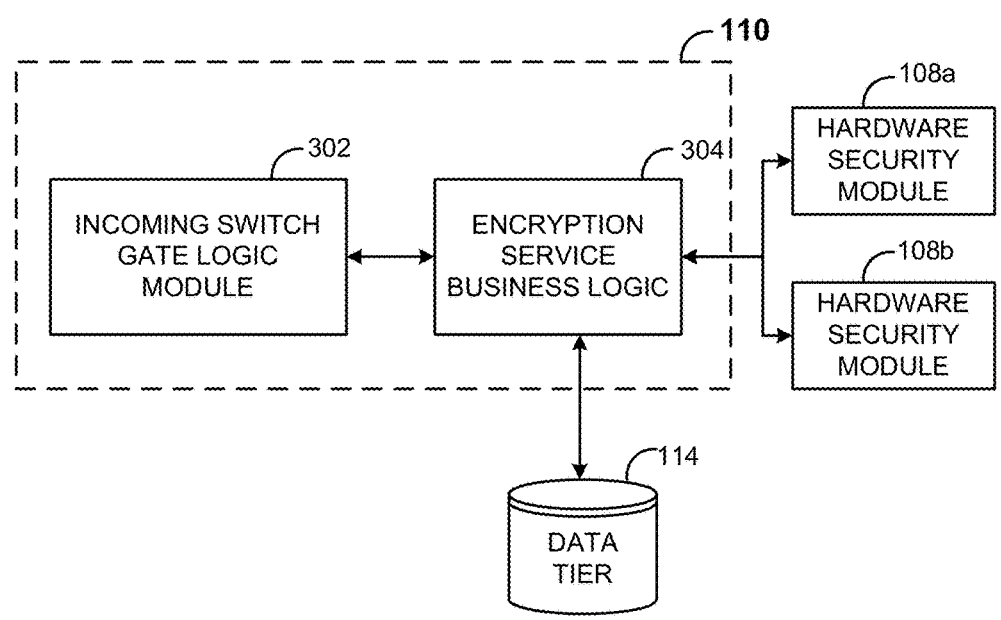
FIG. 3 is an example schematic block diagram for the tokenizer encryption service, in accordance with some embodiments.

FIG. 3 is an example schematic block diagram for the tokenizer encryption service 110, in accordance with some embodiments. This component may include two distinct modules: an incoming switch gate logic module 302 and an encryption service business logic 304. The incoming switch gate logic module 302 may validate credentials of the merchant, and the encryption service business logic 304 may identify keys for the data. The encryption service business logic 304 may access the data tier 114 and one or more hardware security module 108a and 108b. More than one hardware security module 108a and 108b may be employed for redundancy supporting failover and load balance.

Figure 4:
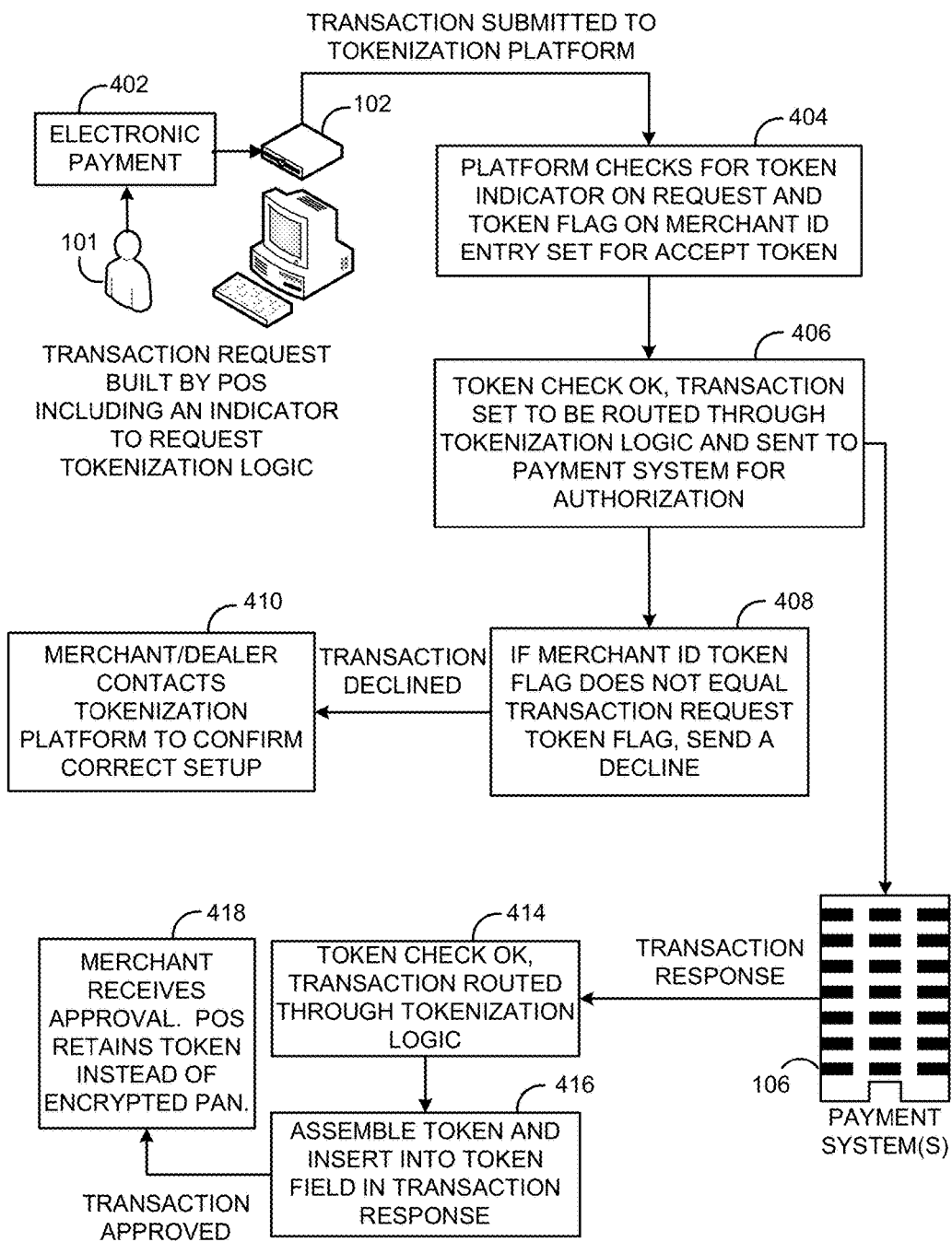
FIG. 4 is an example process flow diagram for multi-merchant tokenization, in accordance with some embodiments.

Lastly, FIG. 4 is an example process flow diagram for tokenization, in accordance with some embodiments. Here it is seen that a purchaser 101 makes an electronic payment 402 via a point of sale terminal 102. In some embodiments, this payment includes getting a code from a payment application, providing this code to the account issuer for validation, receiving back account information, and providing the transaction total with the account information to the payment management system. The transaction request built by the point of sale terminal 102 includes an indication requesting tokenization, in this example.

The transaction is submitted to the tokenization and payment management system 120, in this example, where the transaction data is checked for the token indicator (at 404). The merchant ID included in the transaction data is also compared against records to determine if the merchant is configured for tokenization. If the token indicator is present, and the merchant ID matches the ability to perform tokenization, then the transaction is set to be routed through tokenization logic, and is sent to the payment system(s) 106 for authorization (at 406).

If the merchant ID does not match the token indicator in the transaction, then a decline is sent back to the merchant (at 408). This is a sanity check that ensures that both the transaction and merchant configuration are in alignment prior to approving a transaction. Once the transaction is declined, the merchant may contact the tokenization and payment management system 120 to confirm correct setup if they believe the decline was in error.

If the transaction is approved by the payment system(s) 106, then the transaction may be sent through the tokenization logic (at 414). In alternate embodiments, the transaction is sent through the tokenization logic prior to approval by the payment system(s) 106, and the token is attached to the response by the payment system(s) 106 regardless of approval status. As noted above, the token contemplated herein includes the primary account number, token expiration, card (or account number) expiration, and a group ID.

Once the token is assembled, it is inserted into a token field in the transaction response (at 416). The response is provided to the merchant where the approval is received, and the merchant retains the token instead of the primary account number.

Figure 5:
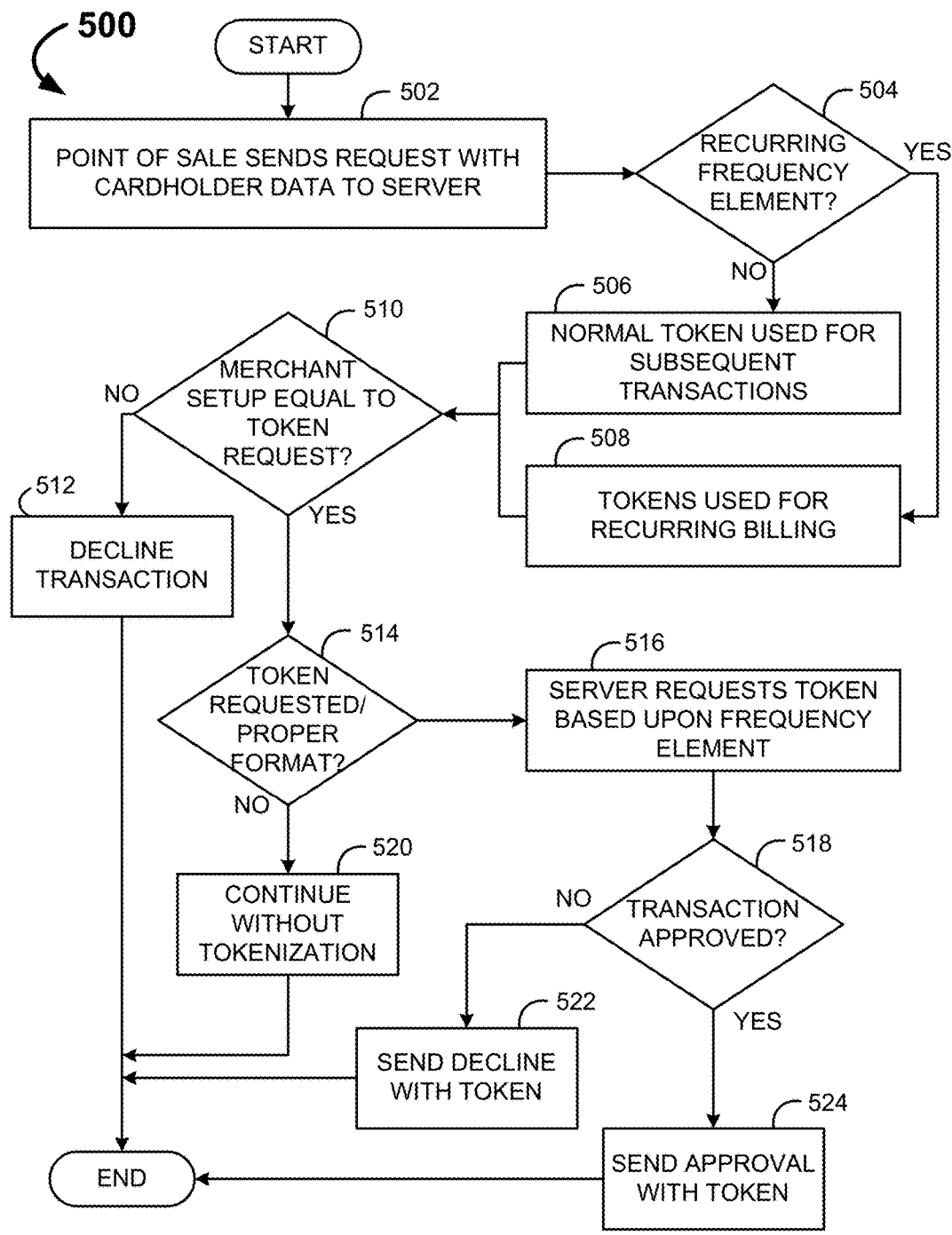
FIGS. 5-7 are example flowcharts for methods for multi-merchant tokenization, in accordance with some embodiments.

FIG. 5 is presented to illustrate one embodiment of a method for multi-merchant tokenization, shown generally at 500. In this example process, the point of sale sends a request with the cardholder's data to the server (at 502). The server may determine if the request includes a recurring frequency element (at 504). If the request is for a recurring token, logic for a recurring billing token may be utilized (at 508). Alternatively, if the request is for a normal single use token, logic for this token may be utilized (at 506). Generally, recurring tokens may differ from normal tokens by having a longer period before they expire.

Next, the token request is compared against the merchant's setup (as stored in a database) to make sure that the token request is in alignment to the merchant's configuration (at 510). If the merchant does not match the token request, the transaction may be declined (at 512). Otherwise, if there is a match between the request and the merchant's configuration, the system determines if a token is being requested (at 514). If no token is requested, the entire tokenization logic may be bypassed and the system may forward the transaction to the payment system(s) 106 without tokenization (at 520). In alternate embodiments, all transactions will be processed for a token regardless if a request for tokenization is present. In these embodiments, merchants that are configured to accept tokens will receive them if they have submitted a correctly formatted transaction request. In these embodiments, only if the request is incorrectly formatted will the tokenization process be bypassed or declined.

However, if tokenization is requested, the server may request a token (at 516) from the hardware security module 108 based upon the frequency element (normal or recurring). If the transaction is approved by the card brand (at 518), then the approval is returned to the merchant (at 524), or is otherwise declined (at 522). In some embodiments, regardless of transaction approval or decline, the token will be provided to the merchant along with the transaction response.

Figure 6:
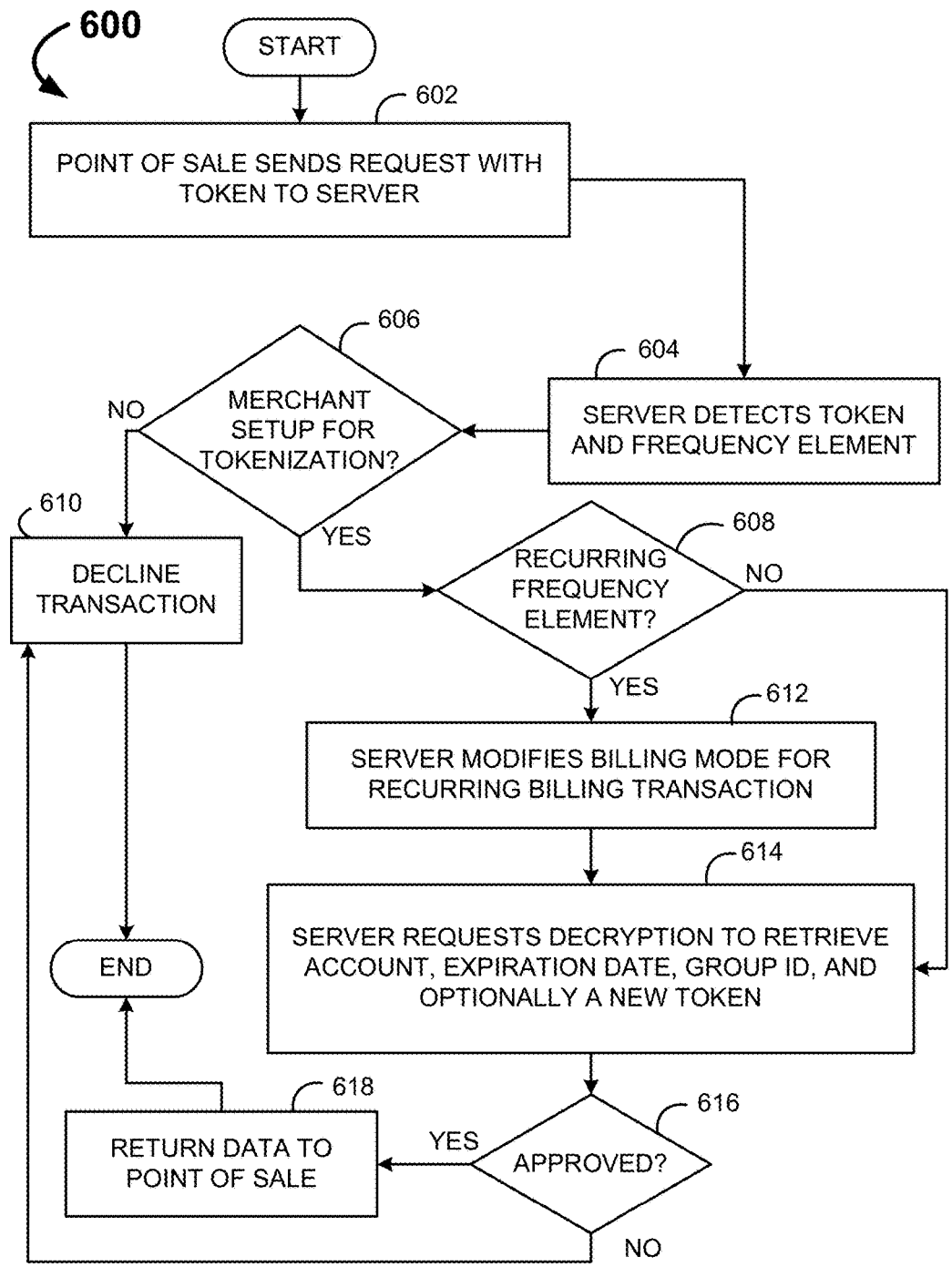

In an alternate method, as shown at 600 of FIG. 6, the point of sale terminal 102 sends a request to the tokenization and payment management system 120 with a token (at 602). The server detects the presence of the token, as well the frequency element of the token (at 604). The system next determines if the merchant is set up for tokenization by querying merchant account information (at 606). If the merchant is not set up for tokenization, the request will be denied (at 610). However, if the merchant is set up for tokenization, then the system may inquire if the frequency element is for a recurring token (at 608).

When a recurring frequency element is present, the server may modify billing mode for recurring billing transactions (at 612). After this, or if no recurring element is present, the tokenizer encryption service 110 requests decryption of the token from the hardware security module 108 to retrieve account numbers, expiration dates, group ID, and optionally the generation of an updated token (at 614). In some embodiments, every transaction may include updates of the token. This ensures tokens never become stale; however, alternate embodiments may keep existing tokens, or only update upon request, in some cases.

The decrypted token information is used to get approval from the payment system(s) 106 (at 616). An approval response (at 618) or declining response (at 610) may be provided back to the point of sale terminal 102. In cases where the token has been updated, the new token may accompany the response regardless of if it was approved. This new token may then be stored within the merchant's system for later use.

As previously noted, due to the presence of a group ID within the token, the system may also undergo a check to determine if the merchant is linked to the group ID. If so, the merchant is authorized to use the token. If not, the transaction may be declined.

Figure 7:
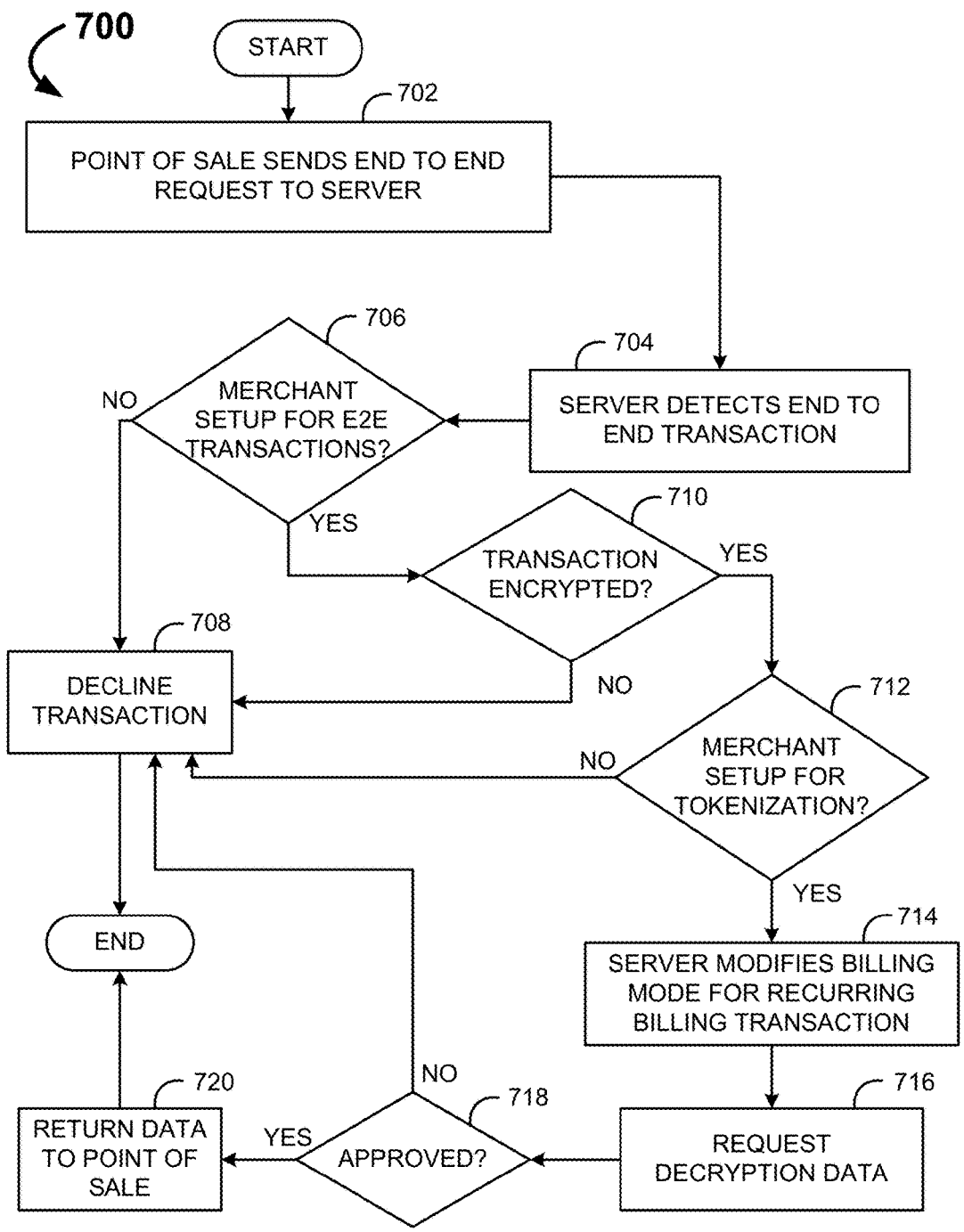

FIG. 7 provides yet another flow diagram for an embodiment for multi-merchant tokenization of transactions, shown generally at 700. In this example process, the point of sale sends an end to end request to the server (at 702). The server detects the end to end transaction (at 704) and ensures that the merchant is configured for such transactions by referencing merchant account data (at 706). If the merchant is not configured for end to end transactions, then the transaction is declined (at 708). However, if the merchant is set up for end to end transactions, the process then determines if the initial request is encrypted (at 710). Subsequently, the system determines if the merchant is configured for tokenization (at 712).

If the request was not encrypted, or if the merchant is not set up for tokenization, then the transaction is declined (at 708). However, if the merchant is configured for tokenization and the request was encrypted, the server modifies the billing mode (at 714) for recurring transactions (if the transaction is a recurring event), and the data is decrypted (at 716). The decrypted data is supplied to a payment system(s) 106 for approval (at 718) and if approved, the data may be returned to the merchant (at 720). Otherwise the transaction may be declined (at 708).

III. Mobile Payments

Figure 9:
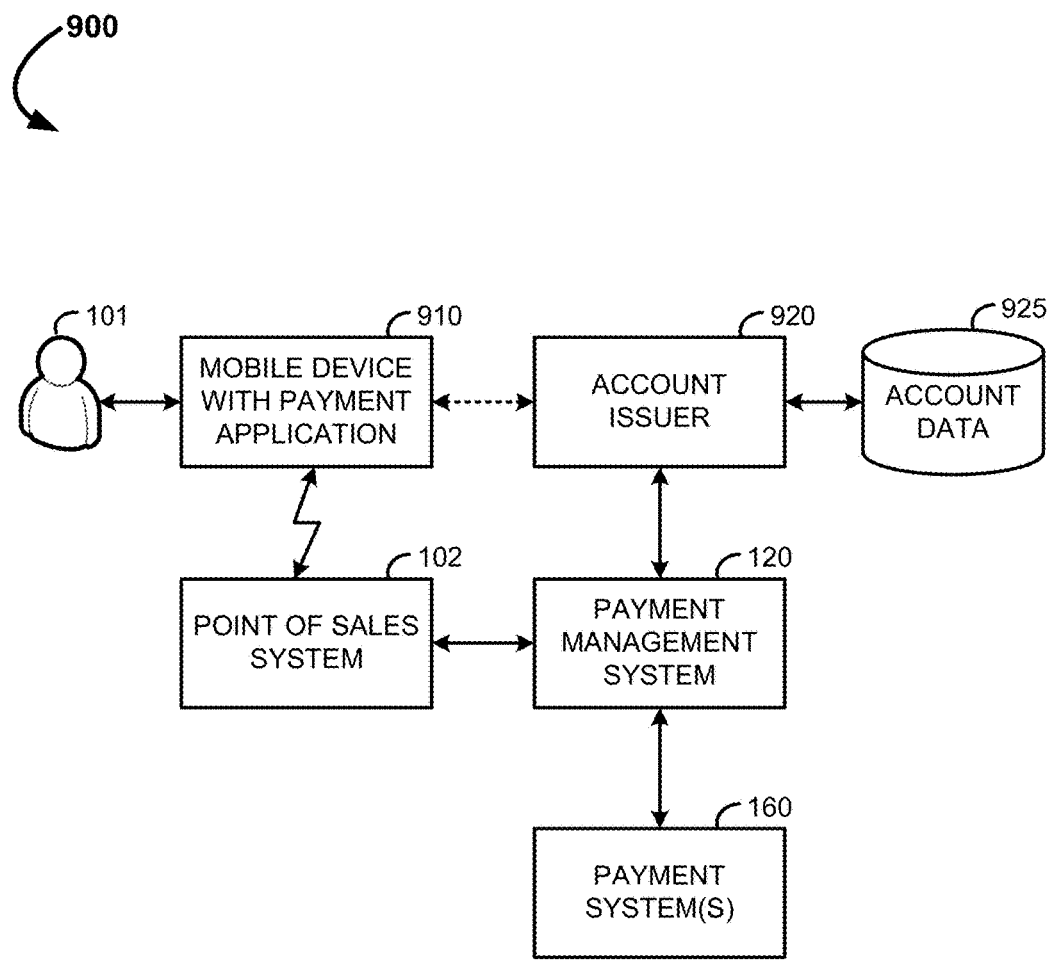
FIG. 9 is an example schematic block diagram for a system for mobile payments using a payment management system, in accordance with some embodiments.

FIG. 9 provides a more detailed schematic block diagram for the system of payment management capable of supporting mobile payments. As previously discussed, the user makes a payment with a mobile device 910 which has a payment application loaded on it. The payment application may generate a code which may be scanned (e.g. QR or barcode), or otherwise inputted, into the POS terminal 102. The code may be provided to the payment management system 120 and then the account issuer 920. The account issuer may be in communication with the mobile device 910 when the code is generated. This enables the code to be validated when it is received by the account issuer 920. Account data that has been configured to be used by the payment application is then retrieved from an account database 925.

The account issuer 920 then provides the account data to the payment management system 120. In some cases the payment management system provides this account data to the point of sales system 102 either in the clear or encrypted format. The POS system 102 then adds the remaining transaction data (e.g., transaction total, merchant ID, etc.) along with the account information and provides this back to the payment management system 120.

In alternate embodiments, the payment system may not provide the account data to the POS system 102, but rather merely indicates that the account information has been retrieved, and collects the additional information required. In this embodiment, the account data is never seen by the merchant, and as such security of the sensitive data is maximized.

In yet other embodiments, the account data is used by the payment management system 120 to generate a token, as described above, and this token may be provided to the merchant.

The payment management system 120 utilizes the account data and other transaction data to complete the transaction with the payment system 160 as previously discussed.

Figure 10:
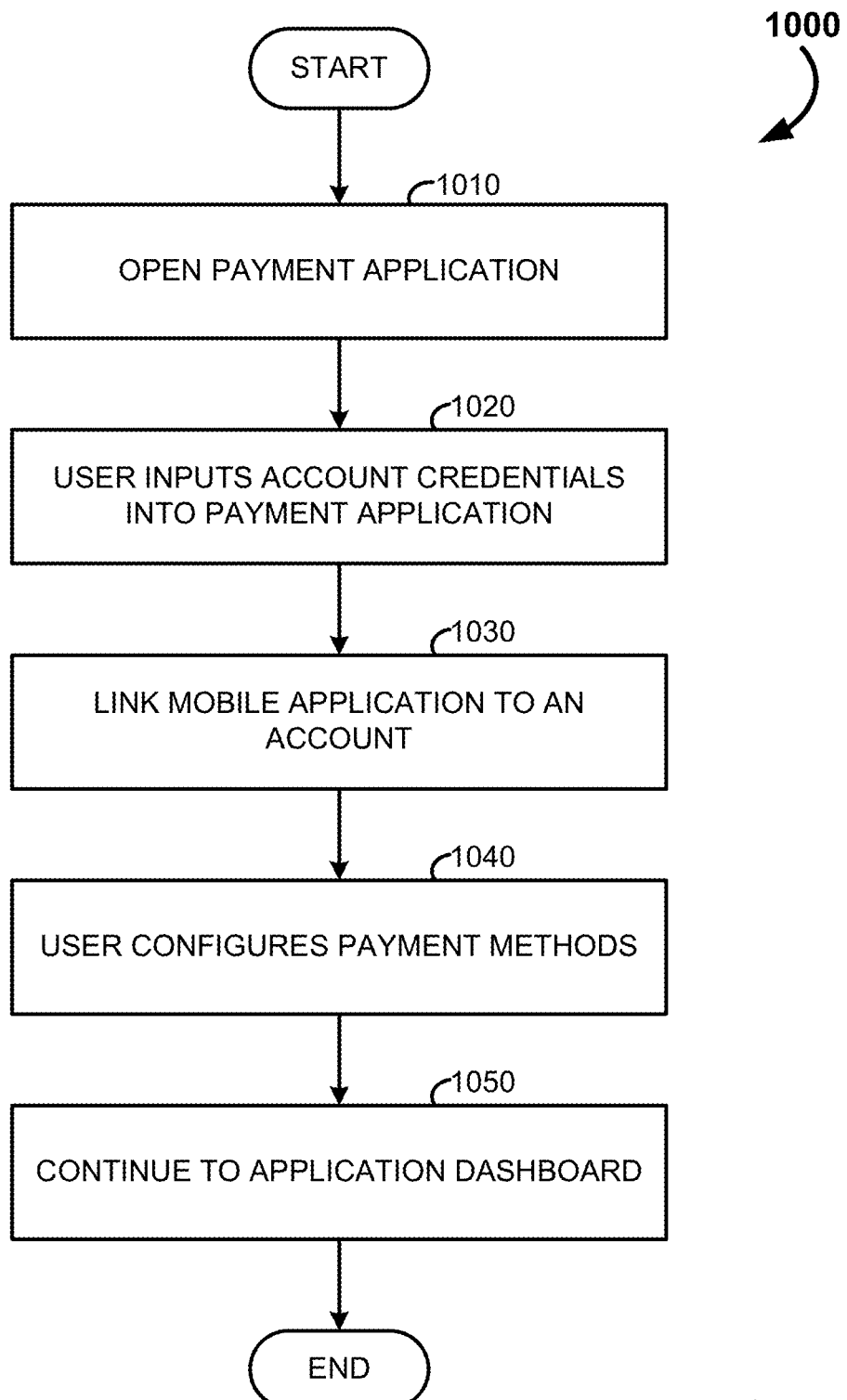
FIG. 10 is an example process flow diagram for configuring a payment application on a mobile device, in accordance with some embodiments.

FIG. 10 provides an example flowchart for the configuration of a payment application, shown generally at 1000. In this example process the user opens the payment application (at 1010) and inputs credential regarding the payment account (at 1020). Account credentials typically include an account number, PIN and/or other identification information.

Next the payment application is linked to the accounts for which the user has credentials for (at 1030). This linking may include the generation of a linkage table between payment applications and associated debit card numbers within the account issuer, in some embodiments.

The user is able to configure payment methods (at 1040) such as alerts, primary accounts to pay with, and the like. Lastly, the application can display a dashboard to the user (at 1050) at which point the application may be ready for purchases.

Figure 11:
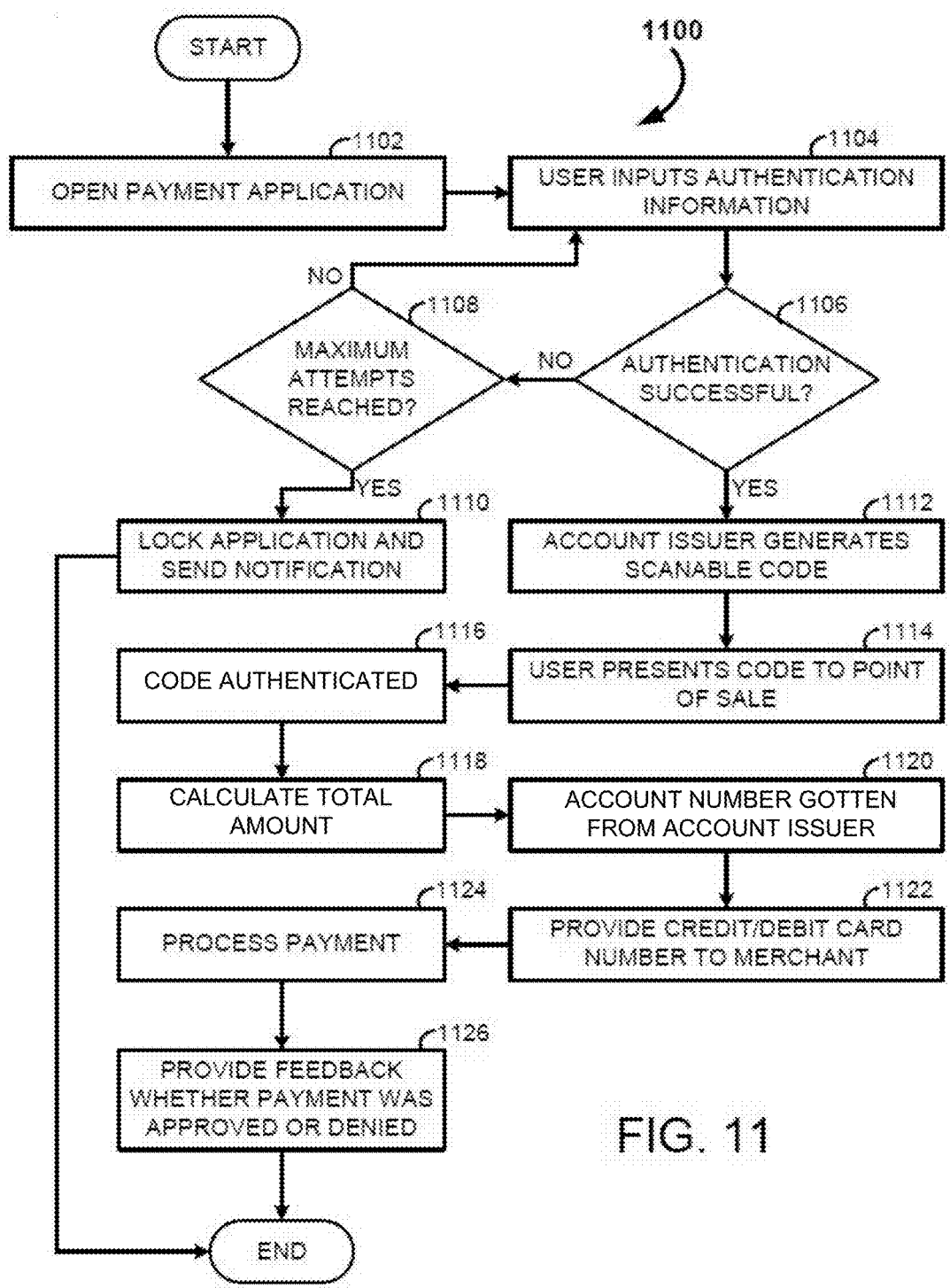
FIG. 11 is an example process flow diagram for making a payment using the payment application on a mobile device, in accordance with some embodiments.

FIG. 11 provides an example flowchart for this purchasing activity, shown generally at 1100. Initially, the payment application must be opened (at 1102) and the user inputs authentication information (at 1104). Authentication information typically takes the form of a PIN, or other secret code, which ensures the person attempting to use the payment application is actually the account holder (or other trusted party). The payment application may compare the authentication against saved data to determine if the authentication is successful (at 1106), or for added security, the mobile device may be configured to contact the account issuer directly to have the authentication performed remotely (thereby ensuring that the payment application cannot be hacked and the security of the device compromised). If the authentication isn't successful, the number of attempts may be logged (again on the mobile device and/or by the account issuer) and a determination may be made whether the maximum number of attempts have been reached or not (at 1108). If not, the user is allowed to re-enter their authentication information. However, if the authentication has failed too many times, the application may instead be locked to prevent fraud (at 1110) and the bank and user may be notified.

If authentication is successful, the account issuer generates a scan-able code (at 1112), in this embodiment, and sends that code to the mobile device. In some embodiments the scan-able code is a QR code that follows ISO standards. In some embodiments, the QR code may include a tokenized account number, account issuer payment token and an expiration date. The account issuer payment token may be a unique token generated per QR code generation.

The user displays the code to the point of sales terminal (at 1114) where it may be scanned. The POS decodes the QR code and provides the data to the payment management system, which in turn authenticates the QR code with the account issuer (at 1116). The POS terminal also calculates the total transaction amount (at 1118). The account issuer provides the POS terminal and/or the payment management system with the account information when the QR code is authenticated (at 1120). As previously noted, in some embodiments the payment management system tokenizes the account information prior to providing the data to the merchant (at 1122). In this way security can be maximized because the POS system is never exposed to sensitive account information.

Using the account information and the transaction total, the payment management system may request approval for the transaction (at 1124) from the payment system (e.g., Global Card Bank, Visa, etc.). The payment management system can also provide feedback as to whether the payment was approved or denied (at 1126).

In this manner a payment management system may support the usage of mobile payments using a payment application loaded on a mobile device. However, an account issuer could accomplish the ability to make mobile payments unilaterally by approaching merchants individually and setting up their POS systems to support direct contact with the account issuer's servers. While this setup may require more burdens upon the merchants, may require upgrades to the POS terminals, and is slow to implement, it is a reasonable alternative to utilizing the disclosed process. However, the disclosed methods of supporting mobile payments utilizing a payment management system also enables the generation of highly tailored value added services, which are not as easily realized when the account issuer approaches merchants directly. This stems from the ability of the payment management system to analyze large volumes of prior transactions, which may be coupled to data gained during the transactions using the payment application to produce highly predictive analytics.

Figure 12:
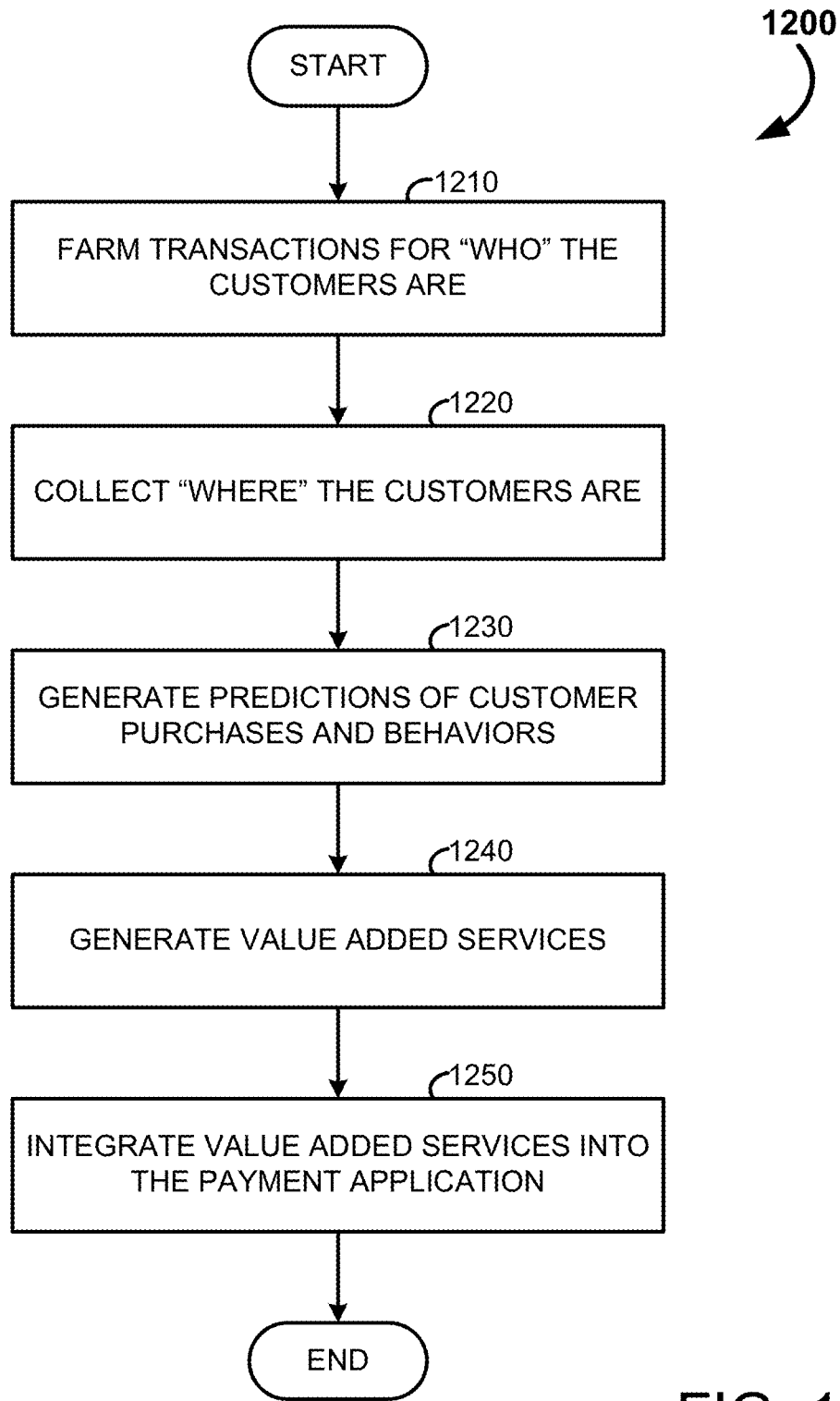
FIG. 12 is an example process flow diagram for generating value added services when mobile payments are employed, in accordance with some embodiments.

FIG. 12 provides an example flowchart for the process of generating value added services, shown generally at 1200. In this example process the payment management system can farm previous transactions for "who" the customer is (at 1210). The payment manager has access to massive volumes of historical transaction data. This data includes information linking transactions to a customer (via account information). The transaction data also includes location of the transaction, amount spent, and even specific products purchased. From this dataset categories of consumers can be generated, based upon similar buying habits. For example, a consumer may be classified as a "single high spender" if the individual purchased from primarily high end stores, in quantities sufficient for a single individual, and spends a substantial amount per capita. Given the vast collection of transaction data available to the payment management system, the granularity of this categorization of consumers can be very high.

The determination of "who" a consumer is can include matching the purchasing habits of an individual consumer to the categories defined above, and/or may include analytics of the consumer's individual purchasing habits, separate from other transactions. This analysis includes using pattern recognition algorithms in order to identify consumer habits. For example, a user may purchase food every day at lunchtime from one of three vendors within three miles of one another. The pattern recognition may be able to identify these repetitive behaviors, and thereby define the "who" of the consumer.

Next, data can be collected as to "where" the consumer is (at 1220). Determining where the consumer is can be completed by cross referencing transactions by the POS location, but in the case of mobile payment can extend beyond this by collecting GPS data (when enabled by the consumer), and even which device the user is employing. For example, in the instance where the consumer is purchasing lunch as described above, it is possible that the consumer pays via a mobile application on his cell phone from the first vendor, pays via debit card at the second vendor, and orders online from a work computer, a half-hour earlier, from the third vendor using the same debit card. The determination of "where" the consumer is includes knowledge of the device being used as well as the user's physical location.

The next step is to generate predictions of the consumer's behaviors (at 1230) using the "who" and "where" data for the user. These predictions may include the knowledge of when the consumer purchases particular goods, and where the consumer purchases the goods. These predictions may be based upon the users location (or predicted location) and previous purchasing history. Further the prediction can include likelihood that the consumer would find particular other retailers attractive based upon the comparison to other similar consumer's purchasing behaviors.

The predictions may be employed to generate value added services (at 1240). These value added services may be integrated into the payment application (at 1250), or may be provided to the consumer via other known communication channels. Returning to our previous example, an email may be sent to the consumer an hour before lunch with a coupon for the third food vendor to influence the purchasing habit of the consumer. This coupon value added service may be funded by the merchant who is interested in expanding sales volume. Likewise, a value added service may be presented on the user's payment application with a deal to a new restaurant based upon transaction records that show that consumers who frequent the first three vendors also tend to frequent the suggested vendor.

V. Examples

FIGS. 13-19 provide example illustrations of the payment application on a smart phone for clarification purposes. These examples are not intended to limit the scope of the embodiments, but rather illustrate one exemplary implementation of the payment application.

Figure 13:
FIGS. 13-19 are example screenshots of a mobile payment application on an example mobile device, in accordance with some embodiments.
Figure 14:
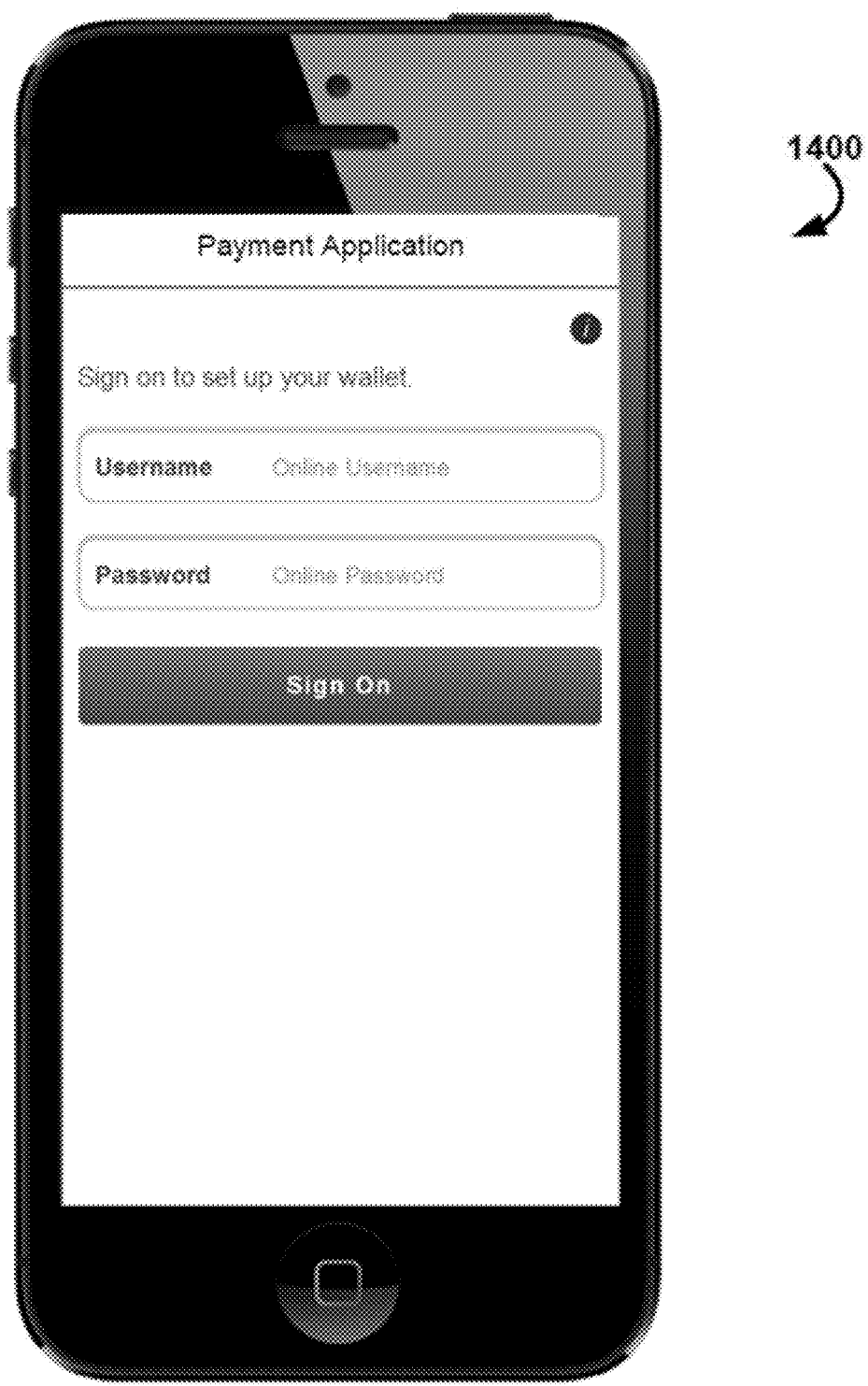
Figure 15:
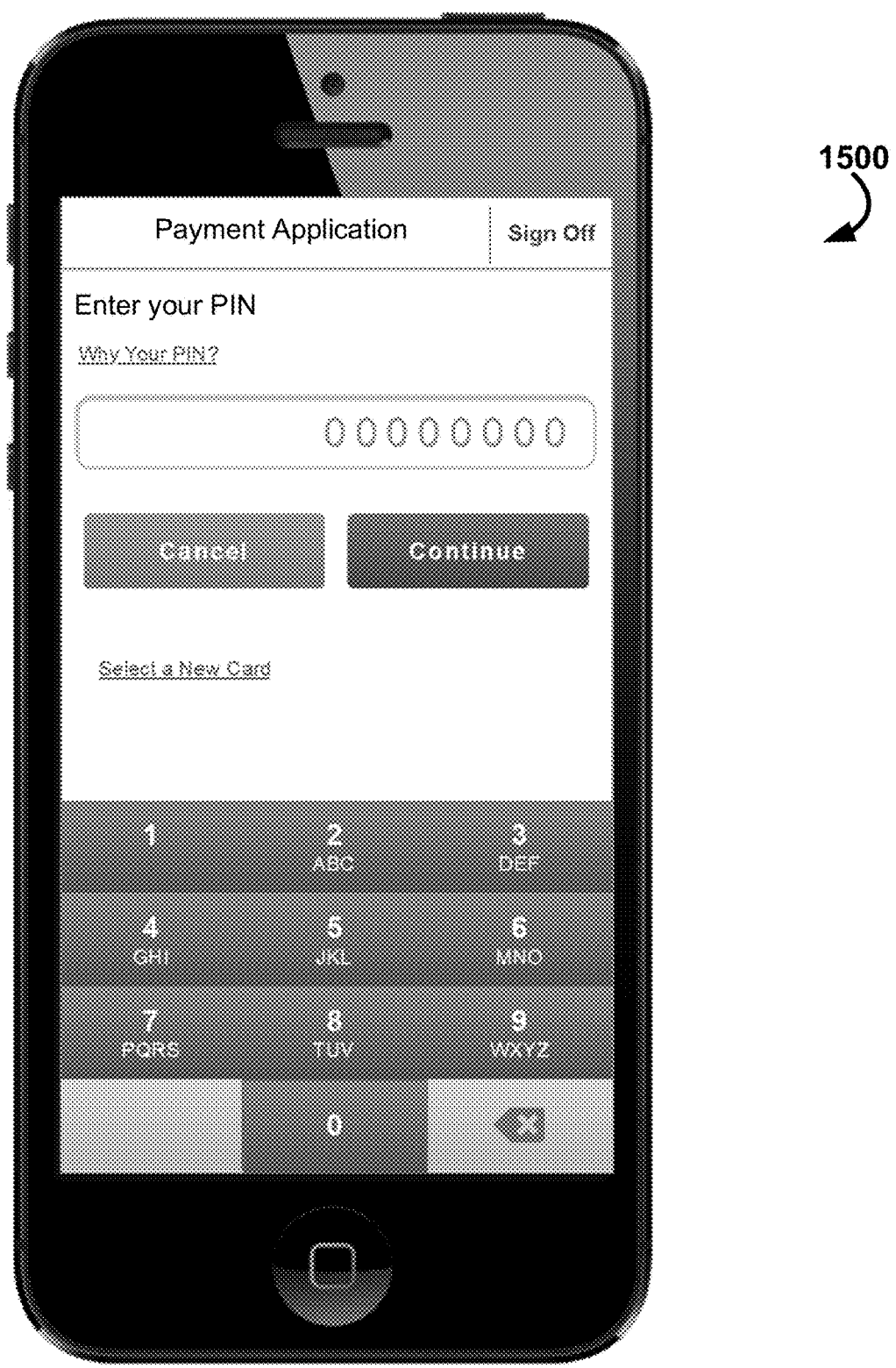

At FIG. 13 the main dashboard for the smart phone is illustrated, at 1300, where application icons are listed. The payment application may also include an icon that may be selected by the user. Selecting this payment application icon for the first time will bring the consumer to the configuration screen of FIG. 14, shown at 1400.

At this configuration interface the user inputs credentials, such as a username and password. Next, with reference to the screen shown at 1500 of FIG. 15, the user is required to provide additional authenticating information, such as a PIN, as the mobile application will be directly accessing the user's funds.

Figure 16:
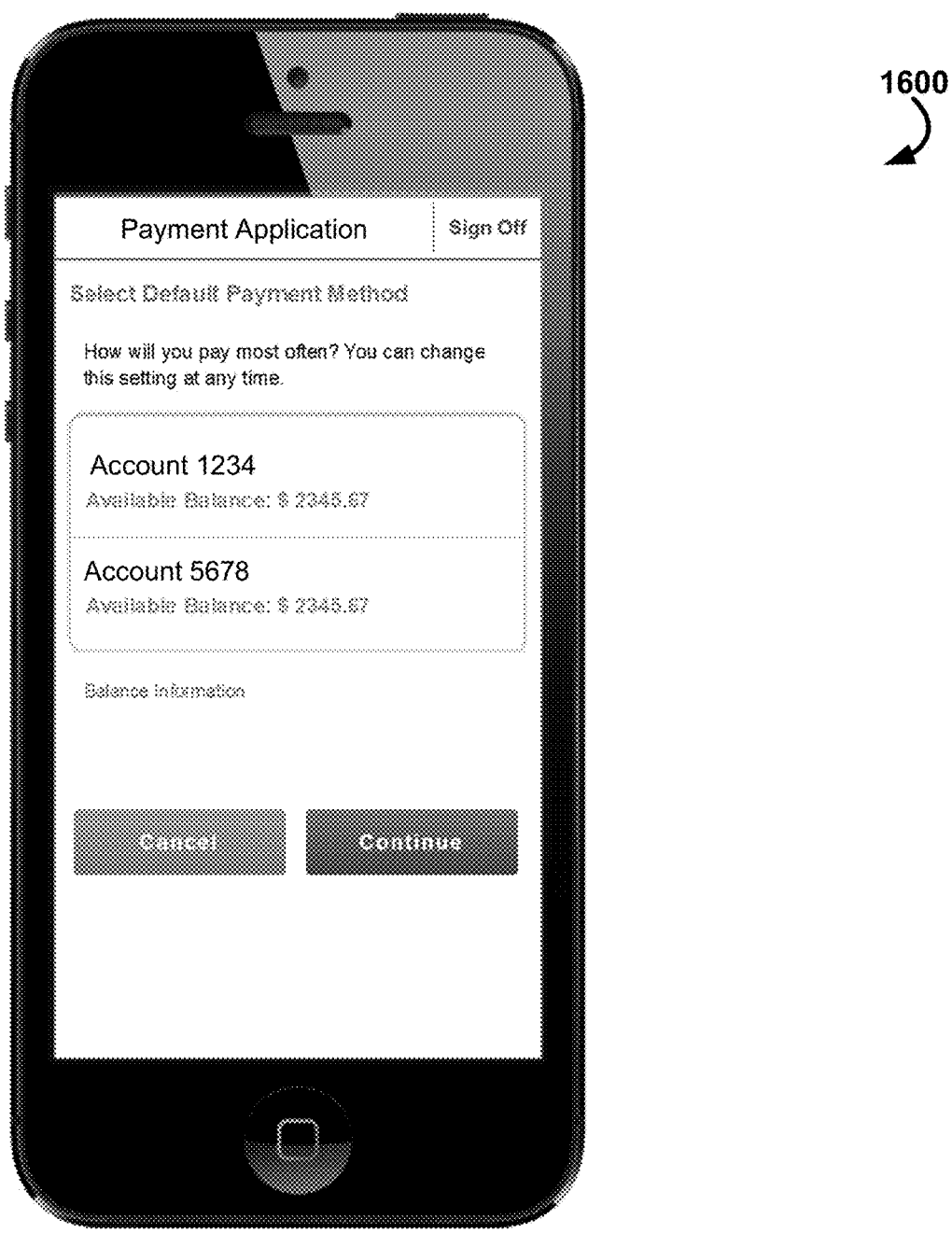
Figure 17:
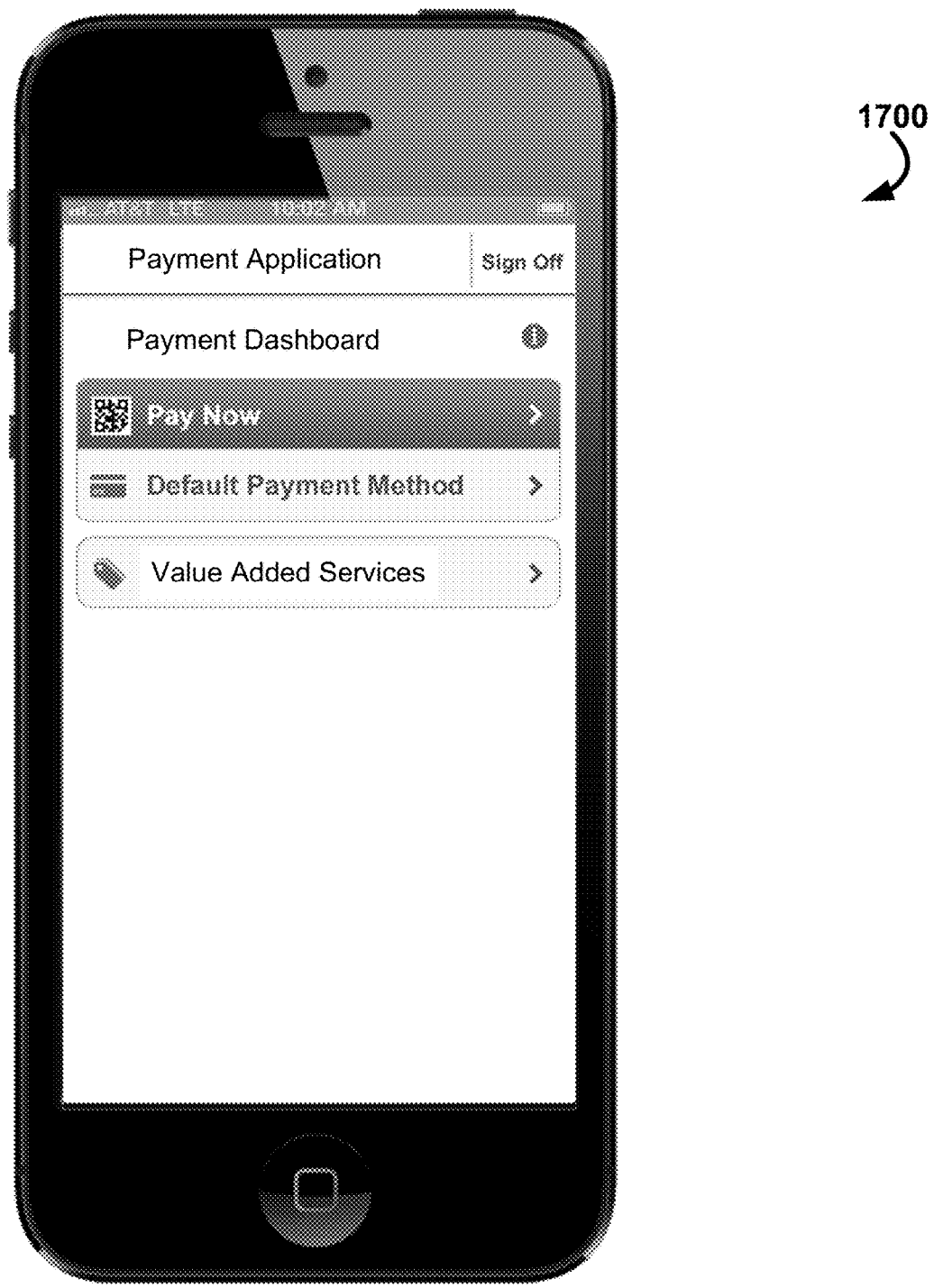
Figure 18:
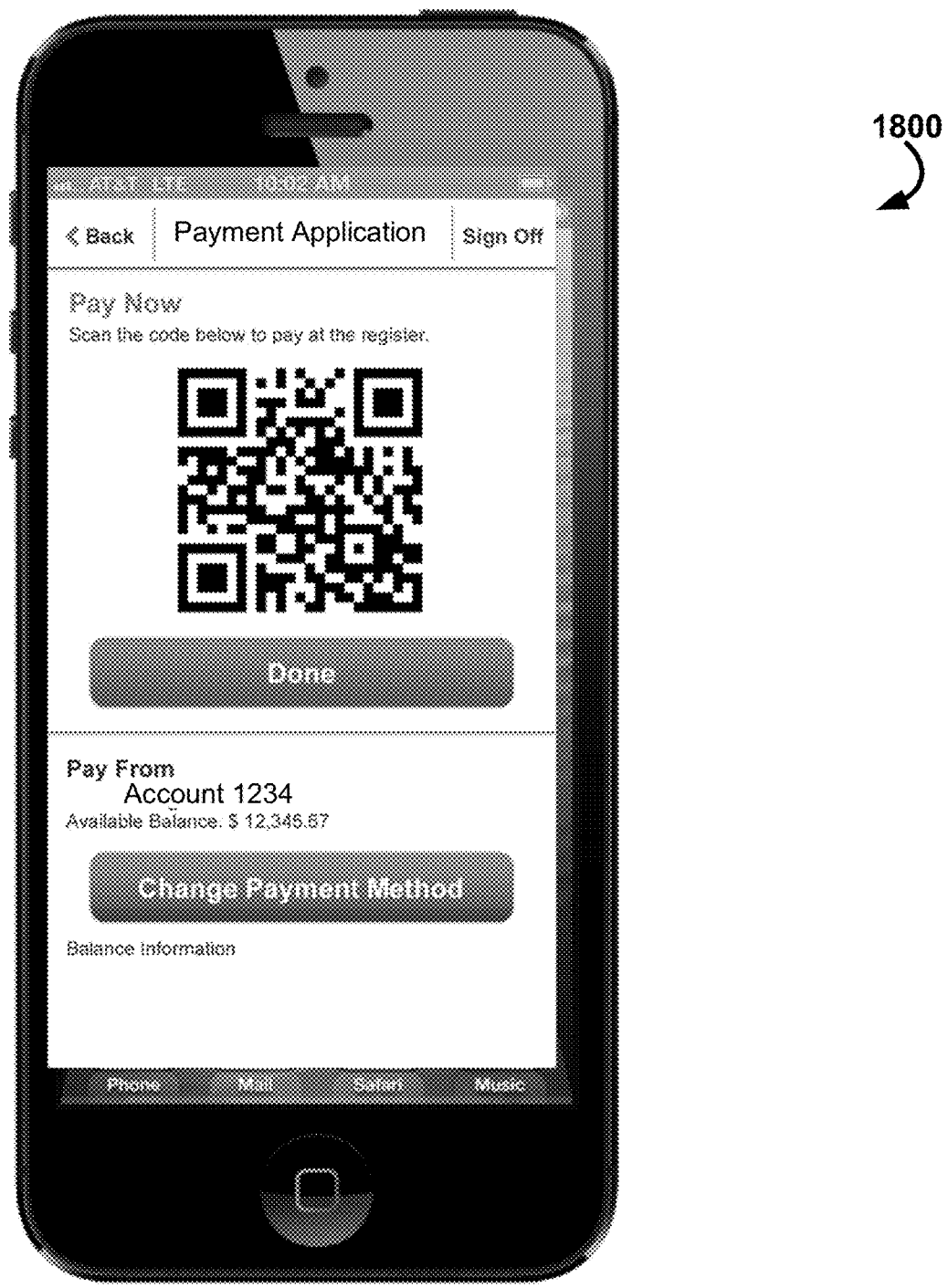
Figure 19:
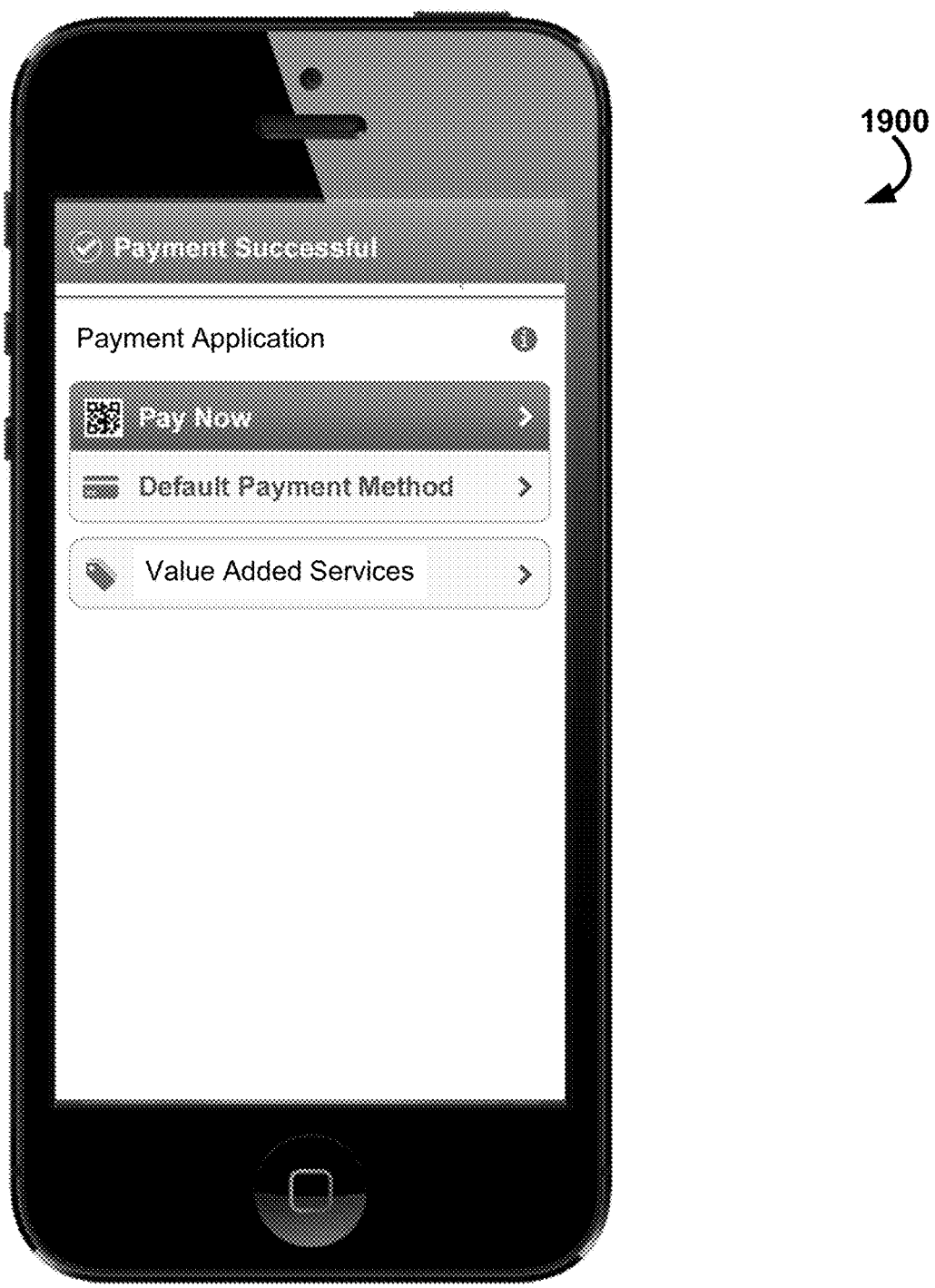

The next step of configuration includes selecting the default payment methods, as seen in relation to the screenshot 1600 in relation to FIG. 16. Once the default payment is selected, the user may be redirected to the main dashboard, as seen at 1700 in relation to FIG. 17.

At the main dashboard the user is able to make mobile payments by clicking the "pay now" or "default payment" button. In addition the payment application may present a menu for value added services, as discussed above.

If the user is making a payment the payment application contacts the account issuer and generates a QR code, in this embodiment, as previously discussed. An example of this QR code can be seen at 1800 in relation to FIG. 18. The QR code may be presented to the POS terminal for scanning.

Once the POS scans the QR code it may be provided to the payment management system which authenticates it with the account issuer. The payment management system gets the account information from the account issuer and used this data, along with the transaction data from the POS to process the transaction with a payment service. The payment service will indicate whether the payment is a success or not. The payment manager may convey this information to the account issuer and the POS terminal. The account issuer may also communicate the transaction was a success to the payment management system, where the transaction status may be displayed, as seen at 1900 in relation to FIG. 19.

V. System Embodiments

Figure 20A:
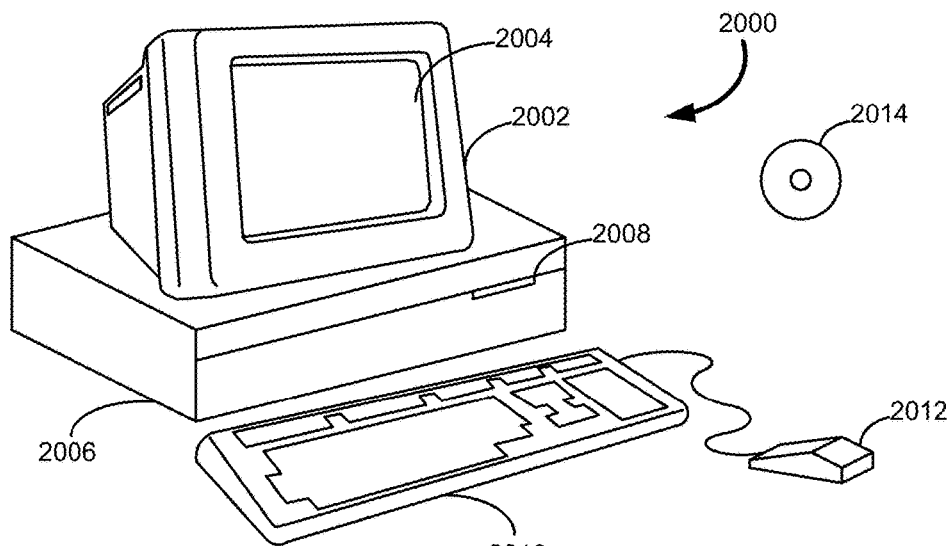
FIGS. 20A and 20B are example illustrations for computer systems configured to embody payment management systems, in accordance with some embodiments.
Figure 20B:
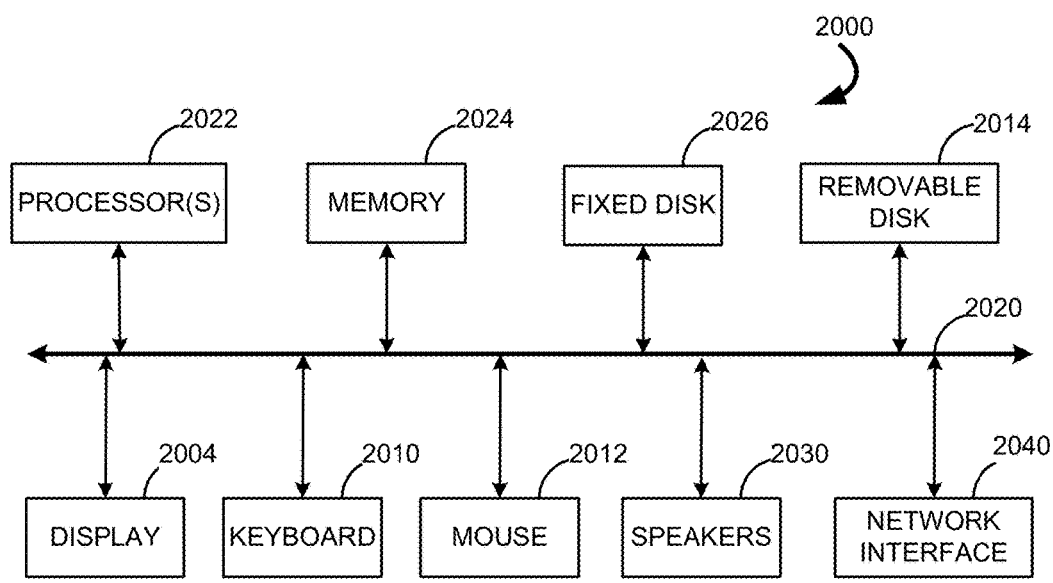

FIGS. 20A and 20B illustrate a Computer System 2000, which is suitable for implementing embodiments of the present invention, including payment management systems. FIG. 20A shows one possible physical form of the Computer System 2000. Of course, the Computer System 2000 may have many physical forms ranging from a printed circuit board, an integrated circuit, and a small handheld device up to a huge super computer. Computer system 2000 may include a Monitor 2002, a Display 2004, a Housing 2006, a Disk Drive 2008, a Keyboard 2010, and a Mouse 2012. Disk 2014 is a computer-readable medium used to transfer data to and from Computer System 2000.

In addition to the standard desktop, or server, computer system illustrated, it is fully within the scope of this disclosure that any computer system capable of the required storage and processing demands would be suitable for embodying the present invention. This may include tablet devices, smart phones, pin pad devices, and any other computer devices, whether mobile or even distributed on a network (i.e., cloud based).

FIG. 20B is an example of a block diagram for Computer System 2000. Attached to System Bus 2020 are a wide variety of subsystems. Processor(s) 2022 (also referred to as central processing units, or CPUs) are coupled to storage devices, including Memory 2024. Memory 2024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 2026 may also be coupled bi-directionally to the Processor 2022; it provides additional data storage capacity and may also include any of the computer-readable media described below. Fixed Disk 2026 may be used to store programs, data, and the like and is typically a secondary storage medium (such as a hard disk) that is slower than primary storage. It will be appreciated that the information retained within Fixed Disk 2026 may, in appropriate cases, be incorporated in standard fashion as virtual memory in Memory 2024. Removable Disk 2014 may take the form of any of the computer-readable media described below.

Processor 2022 is also coupled to a variety of input/output devices, such as Display 2004, Keyboard 2010, Mouse 2012 and Speakers 2030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. Processor 2022 optionally may be coupled to another computer or telecommunications network using Network Interface 2040. With such a Network Interface 2040, it is contemplated that the Processor 2022 might receive information from the network, or might output information to the network in the course of performing the above-described payment management for mobile payments. Furthermore, method embodiments of the present invention may execute solely upon Processor 2022 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

In sum, the present disclosure provides systems and methods for payment management supporting mobile payments. Such systems and methods enable mobile payments to be performed across wider sets of merchants in a more secure manner, and further enable the generation of comprehensive value added services. The payment manager system interfaces with payment systems, account issuers and point of sales terminals in order to facilitate payments made using a payment application on a smart phone, and further to generate predictions for consumer behavior to drive value added services.

While this invention has been described in terms of several embodiments, there are alterations, modifications, permutations, and substitute equivalents, which fall within the scope of this invention.

It should also be noted that there are many alternative ways of implementing the methods and systems of the present invention. It is therefore intended that the following appended claims be interpreted as including all such alterations, modifications, permutations, and substitute equivalents as fall within the true spirit and scope of the present invention.

What is claimed is:

1. A method for payment management of mobile payments, the method comprising:
  receiving, by a server of a payment management system connected to an electronic network, a unique code, a transaction total, and a merchant ID from a point of sale terminal of a merchant, wherein:

the unique code has been generated by a payment application installed in a mobile device of a user, the payment application enabling the user of the mobile device to pay for a transaction;

the unique code encodes a tokenized primary account number, an account issuer payment token, and an expiration date of the account issuer payment token; and the unique code is received from the point of sale terminal of the merchant upon the unique code being presented, by the mobile device of the user, to the point of sale terminal of the merchant and being scanned by the point of sale terminal of the merchant:

transmitting, by the server of the payment management system connected to the electronic network, the unique code to a processing device of an account issuer, wherein the unique code is received and authenticated by the processing device of the account issuer;

receiving, by the server of the payment management system connected to the electronic network, a primary account number from the processing device of the account issuer, wherein the primary account number has been retrieved from an account database upon successful authentication of the unique code by the processing device of the account issuer;

transmitting, by the server of the payment management system connected to the electronic network, the primary account number, the transaction total, and the merchant ID to a payment system;

receiving, by the server of the payment management system connected to the electronic network, a response from the payment system; and completing, by the server of the payment management system, the transaction based on the response.

2. The method of claim 1, wherein the response from the payment system indicates that the primary account number may be encrypted and stored for later retrieval further comprising the steps of:

validating, by the server of the payment management system, the merchant ID against merchant logs, wherein the validating ensures the merchant is configured for tokenization;

generating, by the server of the payment management system, a transaction token for the transaction, wherein the transaction token includes the primary account number, an expiration date of the transaction token, and a group ID; and transmitting, by the server of the payment management system, the response and the transaction token to the point of sale terminal of the merchant.

3. The method of claim 2, wherein the transaction token is encrypted.

4. The method of claim 2, wherein the group ID enables only particular merchants to redeem the transaction token.

5. The method of claim 4, further comprising associating, by the server of the payment management system, a plurality of merchants to the group ID.

6. The method of claim 2, further comprising:

receiving, by the server of the payment management system, the transaction token from at least one point of sale terminal of the merchant;

validating, by the server of the payment management system, the merchant ID against the merchant logs, wherein the validating ensures the merchant is configured for tokenization;

decrypting, by the server of the payment management system, the transaction token;

comparing, by the server of the payment management system, the group ID with to the merchant ID in the merchant logs;

providing, by the server of the payment management system, the primary account number to the payment system;

receiving, by the server of the payment management system, a second response from the payment system; and transmitting, by the server of the payment management system, the second response to the point of sale terminal of the merchant.

7. The method of claim 1, further comprising:

determining, by the server of the payment management system, by farming transaction logs, a consumer type and consumer patterns of the user of the mobile device;

receiving, by the server of the payment management system, location information and device information from the payment application installed in the mobile device of the user;

generating, by the server of the payment management system, predictions of purchasing behavior for the user of the mobile device based on the location information, the consumer type and the consumer patterns;

generating, by the server of the payment management system, value added services for the the user of the mobile device based on the predictions of purchasing behavior; and transmitting, by the server of the payment management system, the value added services to the payment application installed in the mobile device of the user.

8. The method of claim 7, wherein transmitting the value added services to the payment application installed in the mobile device of the user includes routing, by the server of the payment management system, the value added services to the processing device of the account issuer.

9. The method of claim 7, wherein the consumer type is generated by clustering algorithms and the consumer patterns are generated by pattern recognition algorithms.

10. The method of claim 1, further comprising transmitting, by the server of the payment management system, the response from the payment system to the point of sale terminal of the merchant and to the processing device of the account issuer.

11. A system for payment management of mobile payments, comprising:

a server of a payment management system connected to an electronic network and configured to:

receive a unique code, a transaction total, and a merchant ID from a point of sale terminal of a merchant, wherein the unique code has been generated by a payment application installed in a mobile device of a user, the payment application enabling the user of the mobile device to pay for a transaction:

the unique code encodes a tokenized primary account number, an account issuer payment token, and an expiration date of the account issuer payment token; and the unique code is received from the point of sale terminal of the merchant upon the unique code being presented, by the mobile device of the user, to the point of sale terminal of the merchant and being scanned by the point of sale terminal of the merchant;

transmit the unique code to a processing device of an account issuer, wherein the unique code is received and authenticated by the processing device of the account issuer;

receive a primary account number from the processing device of the account issuer, wherein the primary account number has been retrieved from an account database upon successful authentication of the unique code by the processing device of the account issuer, transmit the primary account number, the transaction total, and the merchant ID to a payment system;

receive a response from the payment system; and complete the transaction based on the response.

12. The system of claim 11, wherein the response from the payment system indicates that the primary account number may be encrypted and stored for later retrieval, and wherein the server of the payment management system is further configured to:

validate the merchant ID against merchant logs, wherein the validating ensures the merchant is configured for tokenization;

generate a transaction token for the transaction, wherein the transaction token includes the primary account number an expiration date of the transaction token, and a group ID; and transmit the response and the transaction token to the point of sale terminal of the merchant.

13. The system of claim 12, wherein the transaction token is encrypted.

14. The system of claim 12, wherein the group ID enables only particular merchants to redeem the transaction token.

15. The system of claim 14, wherein the server of the payment management system is further configured to associate a plurality of merchants to the group ID.

16. The system of claim 12, wherein the server of the payment management system is further configured to:

receive the transaction token from at least one point of sale terminal of the merchant;

validate the merchant ID against the merchant logs, wherein the validating ensures the merchant is configured for tokenization;

decrypt the transaction token;

compare the group ID with the merchant ID in the merchant logs;

provide the primary account number to the payment system;

receive a second response from the payment system; and transmit the second response to the point of sale terminal of the merchant.

17. The system of claim 11, wherein the server of the payment management system is further configured to:

determine, by farming transaction logs, a consumer type and consumer patterns of the user of the mobile device;

receive location information and device information from the payment application installed in the mobile device of the user;

generate predictions of purchasing behavior for the user of the mobile device based on the location information, the consumer type and the consumer patterns;

generate value added services for the user of the mobile device based on the predictions of purchasing behavior; and transmit the value added services to the payment application installed in the mobile device of the user.

18. The system of claim 17, wherein transmitting the value added services to the payment application installed in the mobile device of the user includes routing, by the server of the payment management system, the value added services to the processing device of the account issuer.

19. The system of claim 17, wherein the consumer type is generated by clustering algorithms and the consumer patterns are generated by pattern recognition algorithms.

20. The system of claim 11, wherein the server of the payment management system is further configured to:

transmit the response from the payment system to the point of sale terminal of the merchant and to the processing device of the account issuer.

* * * * *

UNITED STATES PATENT AND TRADEMARK OFFICE
CERTIFICATE OF CORRECTION

PATENT NO. : 10,445,720 B2
APPLICATION NO. : 14/046912
DATED : October 15, 2019
INVENTOR(S) : Travis Lee Priest et al.

It is certified that error appears in the above-identified patent and that said Letters Patent is hereby corrected as shown below:

On the Title Page

Item (72) insert --Daniel J. Murphy, Castle Pines, CO (US)-- as the Fourth Inventor.

In the Claims

In Line 3 of Claim 2, delete "retrieval" and insert --retrieval,--.

In Line 14 of Claim 7, delete "the the" and insert --the--.

In Line 11 of Claim 11, delete "transaction:" and insert --transaction;--.

In Lines 31 of Claim 11, delete "issuer," and insert --issuer;--.

In Lines 11 of Claim 12, delete "number" and insert --number,--.

Signed and Sealed this
Tenth Day of December, 2019

Andrei Iancu
*Director of the United States Patent and Trademark Office*